US012425345B2

United States Patent
Meng et al.

(10) Patent No.: US 12,425,345 B2
(45) Date of Patent: Sep. 23, 2025

(54) TRAFFIC SHAPING METHOD AND APPARATUS

(71) Applicant: HUAWEI TECHNOLOGIES CO., LTD., Guangdong (CN)

(72) Inventors: Rui Meng, Beijing (CN); Shoushou Ren, Beijing (CN); Chuang Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 97 days.

(21) Appl. No.: 18/192,063

(22) Filed: Mar. 29, 2023

(65) Prior Publication Data
US 2023/0239248 A1 Jul. 27, 2023

Related U.S. Application Data

(63) Continuation of application No. PCT/CN2021/119119, filed on Sep. 17, 2021.

(30) Foreign Application Priority Data

Sep. 30, 2020 (CN) .......................... 202011063588.7

(51) Int. Cl.
*G06F 15/173* (2006.01)
*H04L 47/22* (2022.01)
(Continued)

(52) U.S. Cl.
CPC .......... *H04L 47/22* (2013.01); *H04L 47/2483* (2013.01); *H04L 47/30* (2013.01); *H04L 47/621* (2013.01)

(58) Field of Classification Search
CPC ..... H04L 47/22; H04L 47/2483; H04L 47/30; H04L 47/621
See application file for complete search history.

(56) References Cited

U.S. PATENT DOCUMENTS 6,714,554 B1 * 3/2004 Jin ...................... H04L 47/6215
370/412
2010/0094989 A1 * 4/2010 Li ........................ H04N 21/658
709/224

(Continued)

FOREIGN PATENT DOCUMENTS

EP 2725750 A1 4/2014
WO 2019214561 A1 11/2019

OTHER PUBLICATIONS

Extended European Search Report issued in EP21874278.1, dated Jan. 4, 2024, 10 pages.

*Primary Examiner* — Padma Mundur

(57) ABSTRACT

A traffic shaping method and a traffic shaping apparatus are disclosed. The method includes: A packet marking apparatus receives a first packet; the packet marking apparatus determines an enqueuing queue of the first packet; and the packet marking apparatus marks a queue identifier of the first packet as a queue identifier of the enqueuing queue of the first packet, and then sends the queue identifier of the first packet to a packet output apparatus, where the packet output apparatus is configured to send, based on the queue identifier of the first packet, the first packet to a corresponding queue for outputting. Therefore, the packet output time after traffic shaping can be determined.

12 Claims, 12 Drawing Sheets

(51) Int. Cl.
*H04L 47/2483* (2022.01)
*H04L 47/30* (2022.01)
*H04L 47/62* (2022.01)

(56) References Cited

U.S. PATENT DOCUMENTS

2017/0366476 A1   12/2017   Sweeney et al.
2019/0356612 A1   11/2019   Hikimochi et al.

* cited by examiner

TRAFFIC SHAPING METHOD AND APPARATUS

CROSS-REFERENCE TO RELATED APPLICATIONS

This application is a continuation of International Application No. PCT/CN2021/119119, filed on Sep. 17, 2021, which claims priority to Chinese Patent Application No. 202011063588.7, filed on Sep. 30, 2020. The disclosures of the aforementioned applications are hereby incorporated by reference in their entireties.

TECHNICAL FIELD

The present disclosure relates to the field of communication technologies, and in particular, to a traffic shaping method and apparatus.

BACKGROUND

A deterministic network is a technology that helps IP networks change from "best-effort" to "on-time, accurate, and fast", to control and reduce an end-to-end latency. The deterministic network is a current hot topic in the industry. The industrial internet, smart factories, programmable logic controllers (PLC) extension, cloudification, and the like all have a demand for the deterministic network. In addition, remote real-time services, for example, augmented reality (AR)/virtual reality (VR) real-time interaction, remote surgery, and tactile internet, also have a demand for the deterministic network. A core of the deterministic network is to ensure an end-to-end bandwidth, a latency, and jitter of a service flow. Traffic shaping is a measure used to proactively adjust a traffic outgoing rate, and traffic shaping is typically used to limit traffic and a burst of a connection on a network, so that packets can be sent out at an even rate. Generally, in the deterministic network, there are devices such as an ingress gateway (iGW), a router, and an egress gateway on a transmission path of a packet from a sending device to a receiving device. After the packet arrives at the ingress gateway, the iGW needs to shape received traffic. A shaping requirement on the iGW in the deterministic network is as follows: A burst volume of traffic obtained through traffic shaping on the iGW is less than or equal to $B_i \times T$ bytes. To be specific, the iGW sends the traffic in a manner in which a quantity of bytes of each flow in per T period does not exceed $B_i \times T$ bytes after traffic shaping, where $B_i$ indicates a bandwidth specified in a service level agreement of each flow.

In the conventional technology, traffic shaping is usually implemented by running a leaky bucket algorithm and inter-flow scheduling per flow. A method in the conventional technology specifically includes: Each flow maintains a queue. For each queue, packets in the queue dequeue through a leaky bucket at a fixed rate. If there is remaining buffer space in the queue, subsequent packets can enqueue to the queue, otherwise, the subsequent packets are discarded. When there is more than one flow, if a plurality of flows has packets that dequeue through the leaky bucket at the same time, in other words, a plurality of queues has packets that dequeue at the same time, the packets that dequeue can reach an output port only after the packets are scheduled.

However, in the foregoing traffic shaping method, when a plurality of flows has packets that dequeue through the leaky bucket at the same time and that need to be scheduled, some packets cannot arrive at the output port immediately, and need to wait for a period of time. The period of time is referred to as a scheduling latency, and the scheduling latency causes uncertain output time of the packets.

SUMMARY

The present disclosure provides a traffic shaping method and apparatus, to determine packet output time after traffic shaping.

According to a first aspect, the present disclosure provides a traffic shaping method, including: A packet marking apparatus receives a first packet, determines an enqueuing queue of the first packet, marks a queue identifier of the first packet as a queue identifier of the enqueuing queue of the first packet, and then sends the queue identifier of the first packet to a packet output apparatus, where the packet output apparatus is configured to send, based on the queue identifier of the first packet, the first packet to a corresponding queue for outputting.

According to the traffic shaping method provided in the first aspect, after receiving the first packet, the packet marking apparatus determines the enqueuing queue of the first packet, marks the queue identifier of the first packet as the queue identifier of the enqueuing queue of the first packet, and then sends the queue identifier of the first packet to the packet output apparatus; and the packet output apparatus sends, based on the queue identifier of the first packet, the first packet to the corresponding queue for outputting. Packets are output from different queues, and enabling time of different queues is known. Therefore, packet output time is fixed, to implement that the packet output time is fixed.

In a possible design, that the packet marking apparatus determines an enqueuing queue of the first packet may be: The packet marking apparatus determines, based on an arrival time of the first packet, the queues that the first packet can enqueue, and then the packet marking apparatus determines the enqueuing queue of the first packet from the queues that the first packet can enqueue. The enqueuing queue is a queue in a group of gating queues, the group of gating queues include N queues, a duration in which each queue in the N queues is continuously enabled is T, and the N queues are cyclically enabled in a preset order. A total length of packets that can be enqueued in each flow i and each queue in the N queues is less than or equal to a first threshold, or a total length of packets that can be enqueued in each flow i and each queue in the N queues is less than or equal to a sum of a first threshold and a maximum packet length of the flow i, where N is a positive integer greater than 1, and i is a positive integer.

According to the traffic shaping method provided in this implementation, the packet marking apparatus first determines, based on the arrival time of the first packet, the queues that the first packet can enqueue, and then determines, from the queues that the first packet can enqueue, the enqueuing queue of the first packet. The enqueuing queue is a queue in the group of gating queues, and the gating queues are rotated by using a group of timing switches. The group of gating queues include N queues, and the duration in which each queue in the N queues is continuously enabled is T. Because packets are output from different gating queues, and time at which different queues in the gating queue are enabled is known, packet output time is fixed, that is, the packet output time is known. In addition, a total length of packets that can be enqueued in each flow i and each queue in the N queues is less than or equal to the first threshold, or is less than or equal to the sum of the first threshold and the maximum packet length of the flow i. In other words, a quantity of bytes sent by each flow i in each period T is controlled to be less than or equal to the first threshold, or a quantity of bytes sent by each flow i in each period T is controlled to be less than or equal to the sum of the first threshold and the maximum packet length of the flow i. In this way, high shaping precision is ensured, and a shaping requirement of a deterministic network is met.

In a possible design, that the packet marking apparatus determines, based on an arrival time of the first packet, the queues that the first packet can enqueue may be: The packet marking apparatus determines, based on the arrival time of the first packet, a maximum transmission duration $t_{max}$ required for sending the packet from the packet marking apparatus to the packet output apparatus, and a minimum transmission duration $t_{min}$ required for sending the packet from the packet marking apparatus to the packet output apparatus, the queues that the first packet can enqueue.

In a possible design, that the packet marking apparatus determines, based on the arrival time of the first packet, a maximum transmission duration $t_{max}$ required for sending the packet from the packet marking apparatus to the packet output apparatus, and a minimum transmission duration $t_{min}$ required for sending the packet from the packet marking apparatus to the packet output apparatus, the queues that the first packet can enqueue may be:

The packet marking apparatus calculates, based on the arrival time $t_0$ of the first packet and $t_{max}$, a latest moment $t_1 = t_0 + t_{max}$ at which the first packet arrives at the packet output apparatus, and calculates, based on the arrival time $t_0$ of the first packet and tin, an earliest moment $t_{1'} = t_0 + t_{min}$ at which the first packet arrives at the packet output apparatus; and the packet marking apparatus determines, based on a first queue in an enabled state at the moment $t_1$ and a second queue in the enabled state at the moment $t_{1'}$, the queues that the first packet can enqueue.

In a possible design, that the packet marking apparatus determines, based on a first queue in an enabled state at the moment $t_1$ and a second queue in the enabled state at the moment t1', the queues that the first packet can enqueue may be:

If the first queue and the second queue are a same queue, the packet marking apparatus determines that the queues that the first packet can enqueue are N−1 queues in the group of gating queues other than the first queue;

if the first queue and the second queue are two adjacent queues, the packet marking apparatus determines that the queues that the first packet can enqueue are N−2 queues in the group of gating queues other than except the first queue and the second queue; or if there are J queues between the first queue and the second queue, the packet marking apparatus determines that the queues that the first packet can enqueue are N−J−2 queues in the group of gating queues other than the first queue, the second queue, and J queues between the first queue and the second queue.

In a possible design, that the packet marking apparatus determines the enqueuing queue of the first packet from the queues that the first packet can enqueue may be:

The packet marking apparatus determines that a total length $B_{add}$ of unqueued packets of a first flow in the queues that the first packet can enqueue is less than a maximum buffer size of the first flow in the queues that the first packet can enqueue, where the first flow is a flow to which the first packet belongs; or the packet marking apparatus determines that a sum of $B_{add}$ and the first packet is less than or equal to B, and then the packet marking apparatus determines, based on $B_{add}$ and the first threshold, the enqueuing queue of the first packet from the queues that the first packet can enqueue.

In a possible design, that the packet marking apparatus determines, based on $B_{add}$ and the first threshold, the enqueuing queue of the first packet from the queues that the first packet can enqueue may be:

If $B_{add}$ is greater than or equal to M−1 times the first threshold and less than M times the first threshold, the packet marking apparatus determines that the enqueuing queue of the first packet is an $M^{th}$ queue following the first queue in the queues that the first packet can enqueue, where M is a positive integer greater than or equal to 1.

In a possible design, that the packet marking apparatus determines, based on $B_{add}$ and the first threshold, the enqueuing queue of the first packet from the queues that the first packet can enqueue may be:

If a total length of packets that are of the first flow and that are currently enqueued in a $1^{st}$ queue following the first queue is less than the first threshold, the packet marking apparatus determines that the enqueuing queue of the first packet is the $1^{st}$ queue following the first queue; or if a total length of packets that are of the first flow and that are currently enqueued in a $1^{st}$ queue following the first queue is greater than or equal to the first threshold, the packet marking apparatus determines that the enqueuing queue of the first packet is a $K^{th}$ queue following the first queue in the queues that the first packet can enqueue, where K is a positive integer greater than or equal to 2, and a total length of currently enqueued packets in the $K^{th}$ queue is less than the first threshold.

In a possible design, that the packet marking apparatus determines that the enqueuing queue of the first packet is a $K^{th}$ queue following the first queue in the queues that the first packet can enqueue may be:

The packet marking apparatus determines, starting from a $2^{nd}$ queue following the first queue, from the queues that the first packet can enqueue, a 1st queue in which the total length of currently enqueued packets of the first flow is less than the first threshold, and determines, as the $K^{th}$ queue, the $1^{st}$ queue in which the total length of the currently enqueued packets of the first flow is less than the first threshold.

In a possible design, that the packet marking apparatus determines, based on $B_{add}$ and the first threshold, the enqueuing queue of the first packet from the queues that the first packet can enqueue may be:

If a sum of a total length of packets that are of the first flow and that are currently enqueued in a $1^{st}$ queue following the first queue and a length of the first packet is less than or equal to the first threshold, the packet marking apparatus determines that the enqueuing queue of the first packet is the $1^{st}$ queue following the first queue; or if a sum of a total length of packets that are of the first flow and that are currently enqueued in a $1^{st}$ queue following the first queue and a length of the first packet is greater than the first threshold, the packet marking apparatus determines that the enqueuing queue of the first packet is a $K^{th}$ queue following the first queue in the queues that the first packet can enqueue, where K is a positive integer greater than or equal to 2, and a sum of a total length of currently enqueued packets in the $K^{th}$ queue and the length of the first packet is less than the first threshold.

In a possible design, that the packet marking apparatus determines that the enqueuing queue of the first packet is a $K^{th}$ queue following the first queue in the queues that the first packet can enqueue may be: The packet marking apparatus determines, starting from a $2^{nd}$ queue following the first queue, from the queues that the first packet can enqueue, a $1^{st}$ queue in which a sum of a total length of currently enqueued packets of the first flow and a length of the first packet is less than or equal to the first threshold; and determines, as the $K^{th}$ queue, the $1^{st}$ queue in which the sum of the total length of the currently enqueued packets of the first flow and the length of the first packet is less than or equal to the first threshold.

In a possible design, the method further includes: The packet marking apparatus determines that $B_{add}$ is greater than or equal to B; or the packet marking apparatus determines that a sum of $B_{add}$ and the first packet is greater than B, and discards the first packet.

In a possible design, after the packet marking apparatus marks the queue identifier of the first packet as the queue identifier of the enqueuing queue of the first packet and sends the marking apparatus to the packet output apparatus, the method further includes: The packet marking apparatus adds the length of the first packet to $B_{add}$; the packet marking apparatus subtracts the first threshold from $B_{add}$ when determining that a $1^{st}$ queue that the first packet can enqueue is different from a $1^{st}$ queue that a previous packet of the first packet can enqueue; and the packet marking apparatus sets $B_{add}$ to 0 when determining that $B_{add}$ is less than the first threshold.

In this implementation, the packet marking apparatus adds $B_{add}$ to the length of the first packet, to implement accumulation of $B_{add}$. When determining that the $1^{st}$ queue that the first packet can enqueue is different from the $1^{st}$ queue that the previous packet of the first packet can enqueue, the packet marking apparatus subtracts the first threshold from $B_{add}$. When determining that $B_{add}$ is less than the first threshold, the packet marking apparatus sets $B_{add}$ to zero, to facilitate determining of enqueuing or discarding a subsequent packet.

In a possible design, the first threshold is $B_i \times T$, Bi is a bandwidth of the first flow, and the first flow is a flow to which the first packet belongs.

According to a second aspect, the present disclosure provides a traffic shaping method, including:

A packet output apparatus receives a first packet, where the first packet carries a queue identifier, and the queue identifier is a queue identifier of an enqueuing queue of the first packet; and the packet output apparatus sends, based on the queue identifier of the first packet, the first packet to a corresponding queue for outputting.

According to the traffic shaping method provided in the second aspect, after the first packet is received by the packet output apparatus, the first packet carries the queue identifier of the enqueuing queue of the first packet, and the packet output apparatus sends, based on the queue identifier of the first packet, the first packet to the corresponding queue for outputting. Packets are output from different queues, and enabling time of different queues is known. Therefore, packet output time is fixed, to implement that the packet output time is fixed.

In a possible design, the enqueuing queue of the first packet is one queue in a group of gating queues, the group of gating queues include N queues, a duration in which each queue in the N queues is continuously enabled is T, and the N queues are cyclically enabled in a preset order. A total length of packets that can be enqueued in each flow i and each queue in the N queues is less than or equal to a first threshold, or a total length of packets that can be enqueued in each flow i and each queue in the N queues is less than or equal to a sum of a first threshold and a maximum packet length of the flow i, where N is a positive integer greater than 1, and i is a positive integer.

In a possible design, the first threshold is $B_i \times T$, Bi is a bandwidth of a first flow, and the first flow is a flow to which the first packet belongs.

According to a third aspect, the present disclosure provides a traffic shaping apparatus, including:
a receiving module, configured to receive a first packet;
a determining module, configured to determine an enqueuing queue of the first packet; and
a sending module, configured to: mark a queue identifier of the first packet as a queue identifier of the enqueuing queue of the first packet, and then send the queue identifier of the enqueuing queue of the first packet to a packet output apparatus, where the packet output apparatus is configured to send, based on the queue identifier of the first packet, the first packet to a corresponding queue for outputting.

In a possible design, the determining module includes:
a determining unit, configured to determine, based on an arrival time of the first packet, queues that the first packet can enqueue; and
a processing unit, configured to determine the enqueuing queue of the first packet from the queues that the first packet can enqueue, where the enqueuing queue is one queue in a group of gating queues, the group of gating queues include N queues, a duration in which each queue in the N queues is continuously enabled is T, and the N queues are cyclically enabled in a preset order; and a total length of packets that can be enqueued in each flow i and each queue in the N queues is less than or equal to a first threshold, or a total length of packets that can be enqueued in each flow i and each queue in the N queues is less than or equal to a sum of a first threshold and a maximum packet length of the flow i, where N is a positive integer greater than 1, and i is a positive integer.

In a possible design, the determining unit is configured to:
determine, based on the arrival time of the first packet, a maximum transmission duration $t_{max}$ required for sending the packet from a packet marking apparatus to the packet output apparatus, and a minimum transmission duration $t_{min}$ required for sending the packet from the packet marking apparatus to the packet output apparatus, the queues that the first packet can enqueue.

In a possible design, the determining unit is configured to:
calculate, based on the arrival time $t_0$ of the first packet and $t_{max}$, a latest moment $t_1 = t_0 + t_{max}$ at which the first packet arrives at the packet output apparatus, and calculate, based on the arrival time $t_0$ of the first packet and $t_{min}$, an earliest moment $t_1 = t_0 + t_{min}$ at which the first packet arrives at the packet output apparatus; and
determine, based on a first queue in an enabled state at the moment $t_1$ and a second queue in the enabled state at the moment $t_{1'}$, the queues that the first packet can enqueue.

In a possible design, the determining unit is configured to:
if the first queue and the second queue are a same queue, determine that the queues that the first packet can enqueue are N−1 queues in the group of gating queues other than the first queue;
if the first queue and the second queue are two adjacent queues, determine that the queues that the first packet can enqueue are N−2 queues in the group of gating queues other than the first queue and the second queue; or if there are J queues between the first queue and the second queue, determine that the queues that the first packet can enqueue are N−J−2 queues in the group of gating queues other than the first queue, the second queue, and the J queues between the first queue and the second queue.

In a possible design, the processing unit is configured to:
determine that a total length $B_{add}$ of unqueued packets of a first flow in the queues that the first packet can enqueue is less than a maximum buffer size B of the first flow in the queues that the first packet can enqueue, where the first flow is a flow to which the first packet belongs; or determine that a sum of $B_{add}$ and the first packet is less than or equal to B; and
determine, based on $B_{add}$ and the first threshold, the enqueuing queue of the first packet from the queues that the first packet can enqueue.

In a possible design, the processing unit is configured to:
if $B_{ad}$ is greater than or equal to M−1 times the first threshold and less than M times the first threshold, determine that the enqueuing queue of the first packet is an $M^{th}$ queue following the first queue in the queues that the first packet can enqueue, where M is a positive integer greater than or equal to 1.

In a possible design, the processing unit is configured to:
if a total length of packets that are of the first flow and that are currently enqueued in a $1^{st}$ queue following the first queue is less than the first threshold, determine that the enqueuing queue of the first packet is the $1^{st}$ queue following the first queue; or
if a total length of packets that are of the first flow and that are currently enqueued in a $1^{st}$ queue following the first queue is greater than or equal to the first threshold, determine that the enqueuing queue of the first packet is a $K^{th}$ queue following the first queue in the queues that the first packet can enqueue, where K is a positive integer greater than or equal to 2, and a total length of currently enqueued packets in the $K^{th}$ queue is less than the first threshold.

In a possible design, the processing unit is specifically configured to:
determine, starting from a $2^{nd}$ queue following the first queue, from the queues that the first packet can enqueue, a $1^{st}$ queue in which the total length of currently enqueued packets of the first flow is less than the first threshold; and determine, as the $K^{th}$ queue, the $1^{st}$ queue in which the total length of the currently enqueued packets of the first flow is less than the first threshold.

In a possible design, the processing unit is configured to:
if a sum of a total length of packets that are of the first flow and that are currently enqueued in a $1^{st}$ queue following the first queue and a length of the first packet is less than or equal to the first threshold, determine that the enqueuing queue of the first packet is the $1^{st}$ queue following the first queue; or
if a sum of a total length of packets that are of the first flow and that are currently enqueued in a $1^{st}$ queue following the first queue and a length of the first packet is greater than the first threshold, determine that the enqueuing queue of the first packet is an $M^{th}$ queue following the first queue in the queues that the first packet can enqueue, where M is a positive integer greater than 1, and a sum of a total length of currently enqueued packets in the $M^{th}$ queue and the length of the first packet is less than the first threshold.

In a possible design, the processing unit is specifically configured to:
determine, starting from a $2^{nd}$ queue following the first queue, from the queues that the first packet can enqueue, a $1^{st}$ queue in which a sum of a total length of currently enqueued packets of the first flow and the length of the first packet is less than or equal to the first threshold; and determine, as an $M^{th}$ queue, a $1^{st}$ queue in which a sum of a total length of currently enqueued packets of the first flow and the length of the first packet is less than or equal to the first threshold.

In a possible design, the processing unit is further configured to:
determine that $B_{add}$ is greater than or equal to B; or determine that the sum of $B_{add}$ and the first packet is greater than B, and discard the first packet.

In a possible design, the processing unit is further configured to:
after the queue identifier of the first packet is marked as the queue identifier of the enqueuing queue of the first packet, and the queue identifier of the first packet is sent to the packet output apparatus, add the length of the first packet to $B_{add}$;
when determining that a $1^{st}$ queue that the first packet can enqueue is different from a $1^{st}$ queue that a previous packet of the first packet can enqueue, subtract the first threshold from $B_{add}$; and
set $B_{add}$ to zero when determining that $B_{add}$ is less than the first threshold.

In a possible design, the first threshold is $B_i \times T$, $B_i$ is a bandwidth of the first flow, and the first flow is a flow to which the first packet belongs.

For beneficial effects of the traffic shaping apparatus provided in the third aspect and the possible designs of the third aspect, refer to beneficial effects brought by the first aspect and the possible implementations of the first aspect.

According to a fourth aspect, the present disclosure provides a traffic shaping apparatus, including:
a receiving module, configured to receive a first packet, where the first packet carries a queue identifier, and the queue identifier is a queue identifier of an enqueuing queue of the first packet; and
a processing module, configured to send, based on the queue identifier of the first packet, the first packet to a corresponding queue for outputting.

In a possible design, the enqueuing queue of the first packet is one queue in a group of gating queues, the group of gating queues include N queues, a duration in which each queue in the N queues is continuously enabled is T, and the N queues are cyclically enabled in a preset order. A total length of packets that can be enqueued in each flow i and each queue in the N queues is less than or equal to a first threshold, or a total length of packets that can be enqueued in each flow i and each queue in the N queues is less than or equal to a sum of a first threshold and a maximum packet length of the flow i, where N is a positive integer greater than 1, and i is a positive integer.

In a possible design, the first threshold is $B_i \times T$, $B_i$ is a bandwidth of a first flow, and the first flow is a flow to which the first packet belongs.

For beneficial effects of the traffic shaping apparatus provided in the fourth aspect and the possible designs of the fourth aspect, refer to beneficial effects brought by the second aspect and the possible implementations of the second aspect.

According to a fifth aspect, the present disclosure provides a traffic shaping apparatus, including:

a processor, configured to execute a program stored in a memory. When the program is executed, the apparatus is enabled to perform the traffic shaping method in any one of the first aspect and the possible designs of the first aspect or the second aspect and the possible designs of the second aspect.

According to a sixth aspect, the present disclosure provides a readable storage medium, where the readable storage medium stores executable instructions, and when at least one processor of a traffic shaping apparatus executes the executable instructions, the traffic shaping apparatus performs the traffic shaping method in any one of the first aspect or the possible designs of the first aspect.

DESCRIPTION OF EMBODIMENTS

Figure 1:
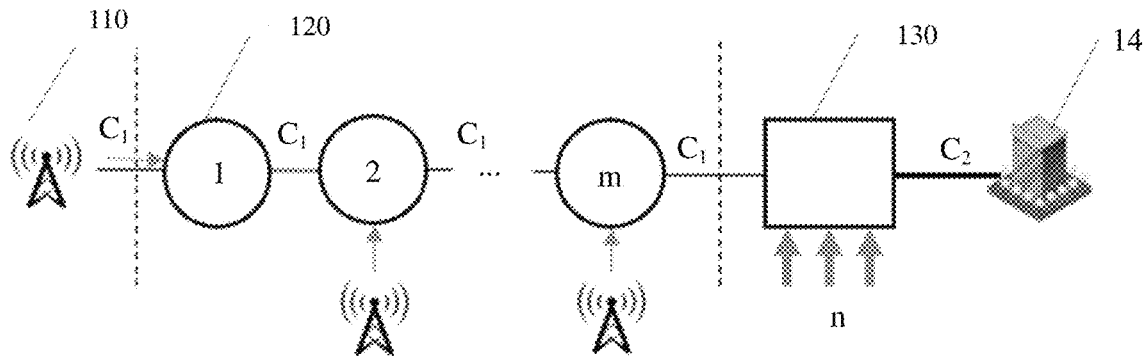
FIG. 1 is a schematic diagram of an architecture of a communication system to which a traffic shaping method according to an embodiment of the present disclosure can be applied.

In embodiments of the present disclosure, words such as "example" or "for example" are used to indicate examples, instances, or description. Any embodiment or solution described as "example" or "for example" in embodiments of the present disclosure is not to be construed as being more preferred or having more advantages than another embodiment or solution. Exactly, use of the word such as "example" or "for example" is intended to present a relative concept in a specific manner. Terms "first" and "second" are merely used for a purpose of description, and shall not be understood as an indication or implication of relative importance.

Embodiments of the present disclosure mainly relate to a traffic shaping technology of a deterministic network. Traffic shaping is a measure used to actively adjust a traffic output rate. A typical function of traffic shaping is to limit traffic and a burst that exits a connection of a network, so that packets are sent out at a relatively even speed. Traffic shaping forces traffic to follow a certain bandwidth allocation limit by reducing the traffic output rate.

Embodiments of the present disclosure may be applied to the deterministic network. A core of the deterministic network is to ensure an end-to-end bandwidth, a latency, and jitter of a service flow. A shaping requirement on an iGW in the deterministic network is as follows: A burst volume of traffic after traffic shaping on the iGW is less than or equal to $B_i \times T$ bytes, where $B_i$ represents a bandwidth specified in a service level agreement of each flow i. Embodiments of the present disclosure may be applied to a case in which traffic with a low average rate and a large burst degree accesses the deterministic network after being shaped by using the traffic shaping method provided in the present disclosure, to implement a deterministic latency. The "deterministic latency" means that a latency and jitter during a packet transmission meet a specified upper limit on the premise that the packet complies with a preset burstness requirement.

In the conventional technology, traffic shaping is implemented by running a leaky bucket algorithm and inter-flow scheduling per flow. A problem in the method is that a scheduling latency causes uncertain output time of a packet. The present disclosure provides a traffic shaping method and apparatus. In this method, a group of gating queues rotated by timing switches are used, the group of gating queues includes N queues, and a duration in which each queue in the N queues is continuously enabled is T. After a packet marking apparatus receives a packet, an enqueuing queue of the packet is first determined, and then the packet is marked with a queue identifier of the enqueuing queue of the packet, then the packet is sent to a packet output apparatus, and the packet output apparatus sends, based on the queue identifier of the packet, the packet to a corresponding queue for outputting. A total length of packets that can be enqueued in each flow i and each queue in the N queues is less than or equal to a first threshold, or is less than or equal to a sum of a first threshold and a maximum packet length of the flow i. Because packets are output from different gating queues, and enabling time of different gating queues is known, packet output time is fixed, that is, the packet output time is known.

In addition, in order to achieve high performance, packets are processed in batches instead of packets per packet in the traffic shaping method in the conventional technology. As a result, a burst occurs. After packets with a low average rate are shaped by using the foregoing method, a traffic burst volume exceeds a quantity of bytes allowed to be sent in each period ($B_i \times T$). Consequently, traffic shaping precision is poor, a traffic shaping requirement of a deterministic network is not met. In the present disclosure, a total length of packets that can be enqueued in each flow i and each queue is less than or equal to the first threshold, or a total length of packets that can be enqueued in each flow i and each queue is less than or equal to a sum of the first threshold and a maximum packet length of the flow i. In other words, a quantity of bytes sent by each flow i in each period T is controlled to be less than or equal to the first threshold, or a quantity of bytes sent by each flow i in each period T is controlled to be less than or equal to a sum of the first threshold and the maximum packet length of the flow i, where the first threshold may be $B_i \times T$. In this way, high shaping precision is ensured, and a shaping requirement of a deterministic network is met.

The following describes in detail the traffic shaping method and apparatus provided in the present disclosure with reference to the accompanying drawings.

FIG. 1 is a schematic diagram of an architecture of a communication system to which a traffic shaping method according to an embodiment of the present disclosure can be applied. As shown in FIG. 1, the communication system may include a base station (BS) 110, a base station gateway (CSG) 120, an aggregation site gateway (ASG) 130, and a mobile edge computing (MEC) server 14. Each substation is connected to a BS by using a data transfer unit (DTU). For example, each BS is connected to two DTUs, and each BS is connected to a network through a CSG. A plurality of CSGs form a CSG ring, and each ASG can be connected to n CSG rings. For example, one CSG ring includes 20 CSGs, and the CSG ring is connected to an ASG. For example, each ASG can be connected to 20 CSG rings. When the BS transmits data to the MEC, a packet sent from the BS reaches the ASG through the CSG ring, and traffic reaches the MEC through one hop on the ASG. The BS is an upstream device of the CSG, and the CSG may be referred to as an ingress gateway. The BS sends a packet to the CSG. When traffic increases or decreases instantaneously, a packet transmission rate is uneven. In this case, traffic shaping needs to be performed. Specifically, traffic shaping may be performed on each CSG. An apparatus for performing the traffic shaping method provided in the present disclosure may be disposed on each CSG, so that traffic shaping can be performed on the CSG. For example, the packet marking apparatus and the packet output apparatus provided in this embodiment may be disposed on each CSG, so that traffic shaping can be performed on the CSG by using the packet marking apparatus and the packet output apparatus.

The communication system shown in FIG. 1 is merely an example, and the present disclosure is not limited thereto.

The traffic shaping method provided in this embodiment may be performed by a network device such as a router or a switch, and the network device may be specifically an ingress gateway or a provider edge (PE) router. The packet marking apparatus and the packet output apparatus shown in the following may be disposed in the ingress gateway or the PE router. Optionally, the packet marking apparatus may be a network processor (NP), and the packet output apparatus may be a traffic managing device. Alternatively, the packet marking apparatus and the packet output apparatus may be different hardware modules. The packet marking apparatus and the packet output apparatus may be deployed on a same device, or may be separately deployed on a connected previous-hop network device and a connected next-hop network device.

Figure 2:
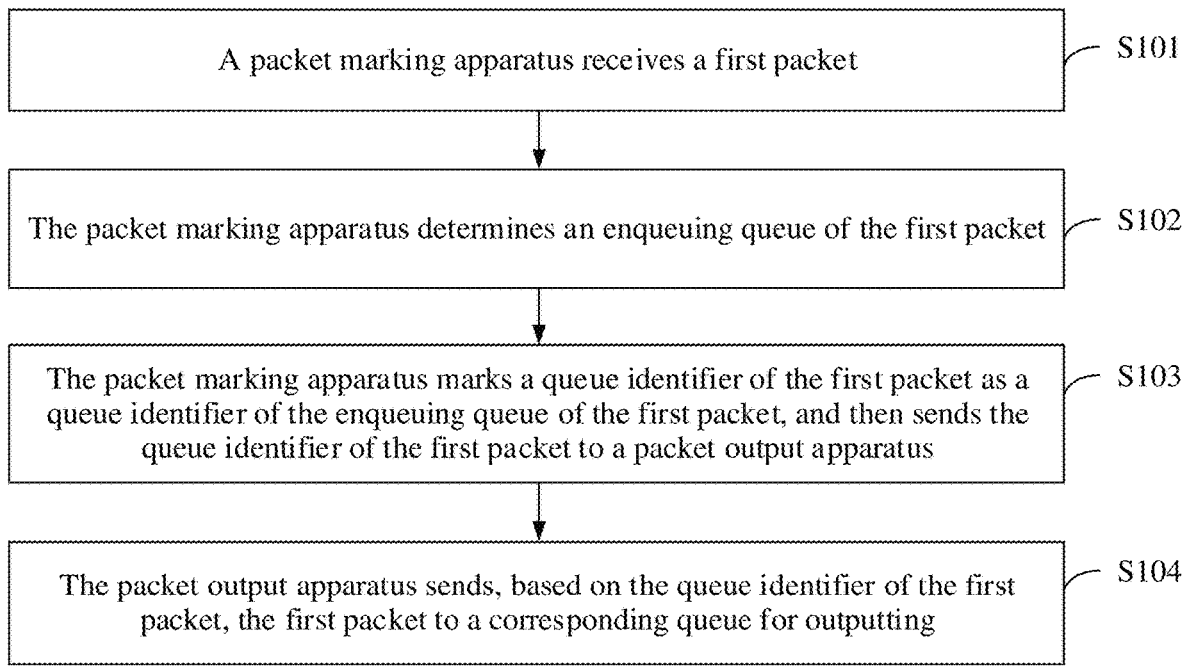
FIG. 2 is a flowchart of an embodiment of a traffic shaping method according to the present disclosure.

FIG. 2 is a flowchart of an embodiment of a traffic shaping method according to the present disclosure. As shown in FIG. 2, the method in this embodiment may include the following steps.

S101: A packet marking apparatus receives a first packet.

Specifically, a first device may receive the first packet sent by an upstream device of the first device, and the packet marking apparatus may receive a packet at a moment, or may receive a pack of packets at a moment, where the first packet is one of the pack of packets. The packet marking apparatus performs the method of S102 and S103 on each packet flow by flow according to an order of packet arrival times to perform processing.

S102: The packet marking apparatus determines an enqueuing queue of the first packet.

Figure 3:
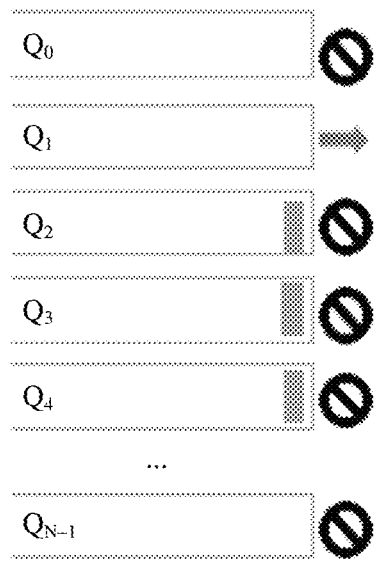
FIG. 3 is a schematic diagram of enabling and disabling a gating queue according to the present disclosure.
Figure 4:
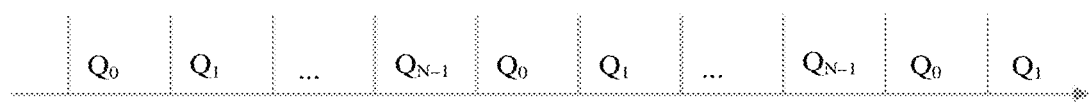
FIG. 4 is a schematic diagram in which enabling time of each gating queue is corresponding to a period on a time axis.

Specifically, the enqueuing queue of the first packet is one queue in a group of gating queues. Specifically, the group of gating queues in this embodiment includes N queues. FIG. 3 is a schematic diagram of enabling and disabling the gating queues according to the present disclosure. As shown in FIG. 3, the group of gating queues include the N queues, where the N queues are, for example, $Q_0$, $Q_1$, $Q_2$, $Q_3$, $Q_4$, ..., and $Q_{N-1}$. A duration in which each queue in the N queues is continuously enabled is T, only one of the N queues is enabled at any moment, and remaining queues are disabled. As shown in FIG. 3, the queue $Q_1$ is enabled at a moment, the remaining queues $Q_0$, $Q_2$, $Q_3$, $Q_4$, ..., and $Q_{N-1}$ are disabled, and the N queues are enabled in a preset order. For example, the N queues are cyclically enabled in a natural order from a $1^{st}$ queue to an $N^{th}$ queue. After enabling time of each queue ends, a current queue is disabled, and a next queue is enabled. FIG. 4 is a schematic diagram of enabling time of each gating queue corresponding to a period on a time axis. As shown in FIG. 4, the N queues are enabled in the order of $Q_0$, $Q_1$, $Q_2$, $Q_3$, $Q_4$, ..., and $Q_{N-1}$, and $Q_{N-1}$ is disabled after being enabled for a duration of T, and then $Q_0$ is enabled. A total length of packets that can be enqueued in each flow i and each queue in the N queues is less than or equal to a first threshold. For example, the total length of packets that can be enqueued in each queue of the N queues is equal to the first threshold, is subtracted by 1 byte from the first threshold, or is subtracted by 2 bytes from the first threshold. Alternatively, a total length of packets that can be enqueued in each flow i and each queue in the N queues is less than or equal to a sum of a first threshold and a maximum packet length of the flow i, where i is a positive integer. For example, for the flow i, the total length of packets that can be enqueued in each flow i and each queue is less than or equal to the sum of the first threshold and the maximum packet length of the flow i. Optionally, the first threshold may be $B_i \times T$, and Bi is a bandwidth of a flow to which the first packet belongs. In this embodiment, the total length of packets that can be enqueued in each flow i and each queue is less than or equal to the first threshold, or the total length of packets that can be enqueued in each flow i and each queue is less than or equal to the sum of the first threshold and the maximum packet length of the flow i. In other words, a quantity of bytes sent by each flow i in each period T is controlled to be less than or equal to the first threshold, or a quantity of bytes sent by each flow i in each period T is controlled to be less than or equal to the sum of the first threshold and the maximum packet length of the flow i. In this way, high shaping precision is ensured, and a shaping requirement of a deterministic network is met.

The gating queues in this embodiment may be a group of gating queues deployed for each output port, or may be a group of gating queues shared by all output ports. The output port may be an output port on a device such as an ingress gateway or a PE router.

In an implementation, S102 may include the following steps.

S1021: The packet marking apparatus determines, based on an arrival time of the first packet, queues that the first packet can enqueue.

The arrival time of the first packet is a moment at which the first packet arrives at the packet marking apparatus. Specifically, if the first packet enqueues at a moment t, the first packet cannot enqueue a queue in an enabled state at the moment t. For example, if the queue in the enabled state at the moment t is $Q_x$, the first packet cannot enqueue $Q_x$, because if the first packet enqueues the queue $Q_x$, the first packet may not be sent in time before $Q_x$ is disabled. The packet marking apparatus needs to first determine the queues that the first packet can enqueue, that is, queues that can be currently enqueued, and then determine a final enqueuing queue from the queues that the first packet can enqueue. Specifically, the packet marking apparatus may determine, based on the arrival time of the first packet, a maximum transmission duration $t_{max}$ required for sending the packet from the packet marking apparatus to the packet output apparatus, and a minimum transmission duration $t_{min}$ required for sending the packet from the packet marking apparatus to the packet output apparatus, the queues that the first packet can enqueue.

The maximum transmission duration $t_{max}$ required for sending the packet from the packet marking apparatus to the packet output apparatus and the minimum transmission duration $t_{min}$ required for sending the packet from the packet marking apparatus to the packet output apparatus may be preset values. Specifically, a data transmission duration between the packet marking apparatus and the packet output apparatus may be pre-stored in the packet marking apparatus after being determined.

In a possible implementation, that the packet marking apparatus determines, based on the arrival time of the first packet, $t_{max}$, and $t_{min}$, the queues that the first packet can enqueue may include:

First, the packet marking apparatus calculates, based on the arrival time $t_0$ of the first packet and $t_{max}$, a latest moment $t_1=t_0+t_{max}$ at which the first packet arrives at the packet output apparatus, and calculates, based on the arrival time to of the first packet and $t_{min}$, an earliest moment $t_{1'}=t_0+t_{min}$ at which the first packet arrives at the packet output apparatus.

Then, the packet marking apparatus determines, based on a first queue in an enabled state at the moment $t_1$ and a second queue in the enabled state at the moment $t_{1'}$, the queues that the first packet can enqueue.

Specifically, the duration T in which each queue in the gating queues is continuously enabled and enabling time of a $1^{st}$ queue in the gating queues are pre-stored in the packet marking apparatus and the packet output apparatus. Both the packet marking apparatus and the packet output apparatus learn of the duration T in which each queue in the gating queues is continuously enabled and the enabling time of the $1^{st}$ queue in the gating queues. Therefore, the packet marking apparatus may determine, based on the pre-stored duration T in which each queue in the gating queues is continuously enabled and the pre-stored enabling time of the $1^{st}$ queue in the gating queues, the first queue in the enabled state at the moment $t_1$ and the second queue in the enabled state at the moment $t_{1'}$. The packet marking apparatus may determine the enqueuing queue of the first packet based on the first queue and the second queue.

There are three possible cases in which the packet marking apparatus determines, based on the first queue in the enabled state at the moment $t_1$ and the second queue in the enabled state at the moment $t_{1'}$, the queues that the first packet can enqueue.

1. If the first queue and the second queue are the same queue, the packet marking apparatus determines that the queues that the first packet can enqueue are N−1 queues in the group of gating queues other than the first queue.

2. If the first queue and the second queue are two adjacent queues, the packet marking apparatus determines that the queues that the first packet can enqueue are N−2 queues in the group of gating queues other than the first queue and the second queue.

3. If there are J queues between the first queue and the second queue, the packet marking apparatus determines that the queues that the first packet can enqueue are N−J−2 queues in the group of gating queues other than the first queue, the second queue, and the J queues between the first queue and the second queue.

Figure 5:
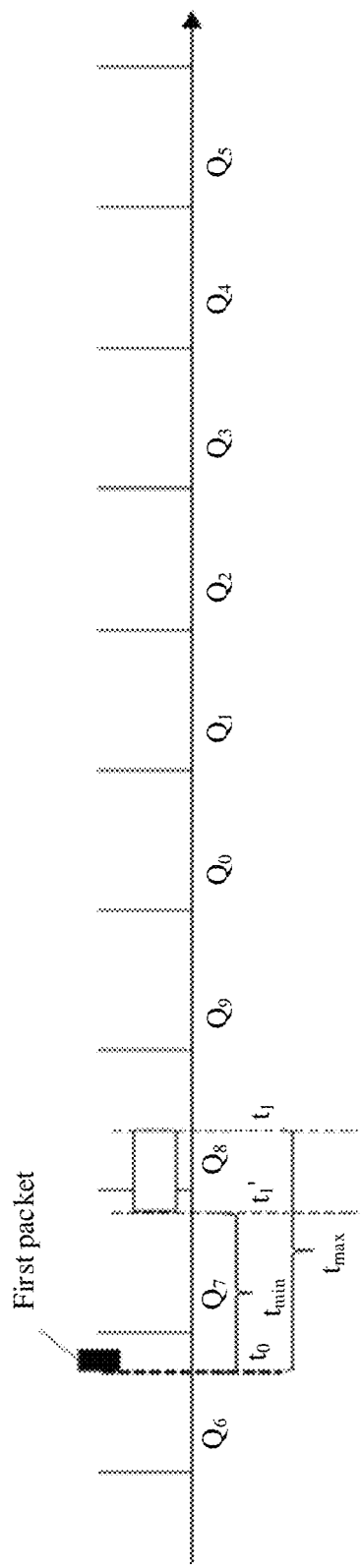
FIG. 5 is a schematic diagram of determining queues that a first packet can enqueue according to an embodiment of the present disclosure.

For example, the group of gating queues include N=10 queues. FIG. 5 is a schematic diagram of determining queues that the first packet can enqueue according to an embodiment of the present disclosure. As shown in FIG. 5, the first packet arrives at the packet marking apparatus at a moment $t_0$. An earliest moment at which the first packet arrives at the packet output apparatus is $t_{1'}=t_0+t_{min}$, a latest moment at which the first packet arrives at the packet output apparatus is $t_1=t_0+t_{max}$, and a moment at which the first packet may arrive at the packet output apparatus is between $t_{1'}$ and $t_1$. The first queue in the enabled state at $t_1$ is $Q_8$, the second queue in the enabled state at $t_{1'}$ is $Q_7$, and $Q_7$ and $Q_8$ are two adjacent queues. Therefore, $Q_7$ and $Q_8$ are queues that cannot be enqueued, the queues that the first packet can enqueue are N−2=8 queues other than $Q_7$ and $Q_8$, that is, $Q_9$, $Q_0$, $Q_1$, $Q_2$, $Q_3$, $Q_4$, $Q_5$, and $Q_6$, and a $1^{st}$ queue that the first packet can enqueue is $Q_9$, and a last queue that the first packet can enqueue is $Q_6$.

Figure 6:
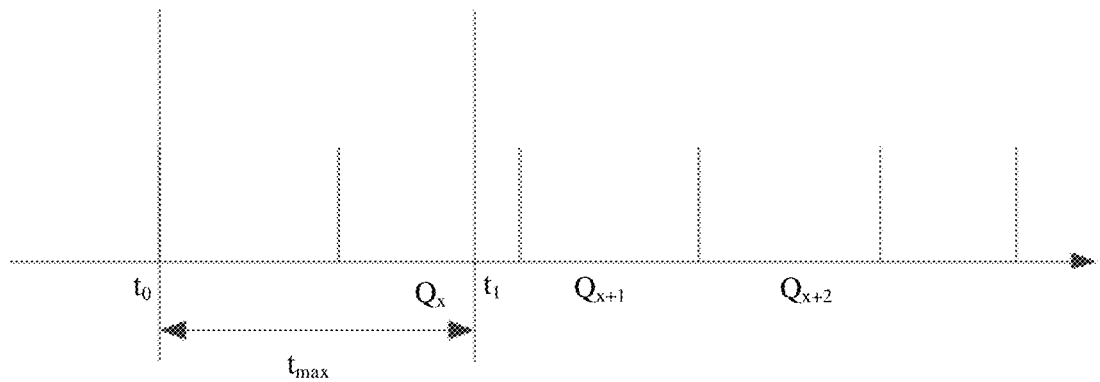
FIG. 6 is a schematic diagram of a first queue in an enabled state at a moment $t_1$ according to an embodiment of the present disclosure.
Figure 7:
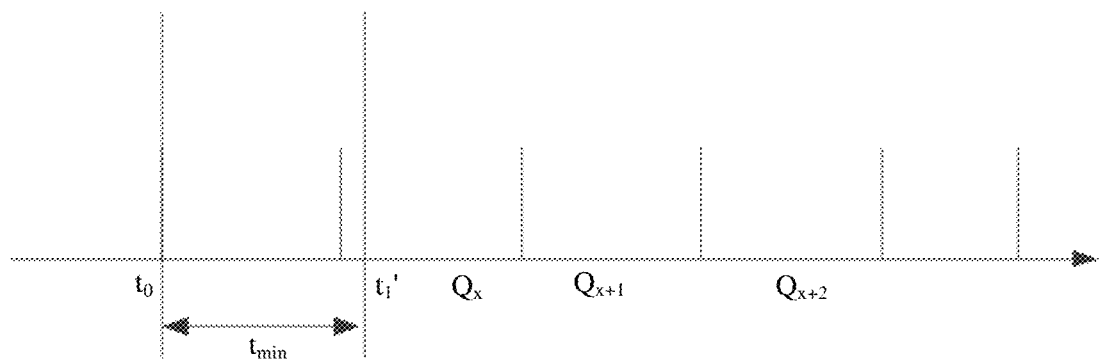
FIG. 7 is a schematic diagram of a second queue in an enabled state at a moment $t_{1'}$ according to an embodiment of the present disclosure.

FIG. 6 is a schematic diagram of the first queue in the enabled state at the moment $t_1$ according to an embodiment of the present disclosure. FIG. 7 is a schematic diagram of the second queue in the enabled state at the moment $t_{1'}$ according to an embodiment of the present disclosure. As shown in FIG. 6 and FIG. 7, the first queue and the second queue are the same, and both the first queue and the second queue are $Q_x$. In this case, the enqueuing queue of the first packet is one of N−1 queues other than the first queue $Q_x$. It should be noted that if a queue in the enabled state at the moment $t_1$ is $Q_x$, the first packet cannot enqueue $Q_x$, because if the first packet enqueues the queue $Q_x$, the first packet may not be sent in time before $Q_x$ is disabled. Therefore, an earliest period in which the first packet can be sent is a period in which $Q_{x+1}$ is enabled, and a latest period in which the first packet can be sent is a period in which $Q_{x-1}$ is enabled. In this case, the enqueuing queue of the first packet is one of N−1 queues other than the first queue $Q_x$.

Figure 8:
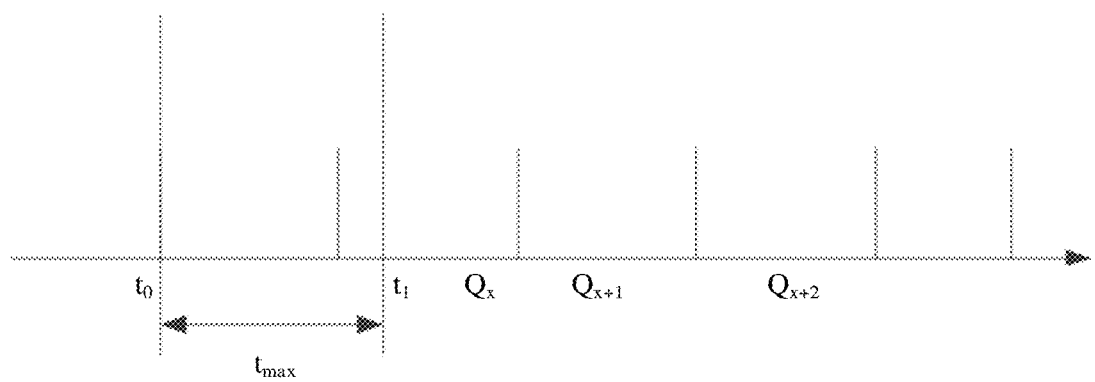
FIG. 8 is another schematic diagram of a first queue in an enabled state at a moment $t_1$ according to an embodiment of the present disclosure.
Figure 9:
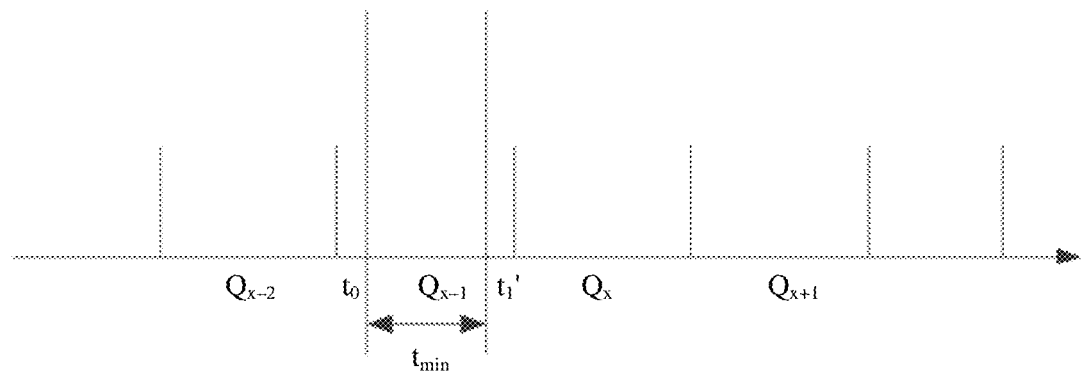
FIG. 9 is another schematic diagram of a second queue in an enabled state at a moment $t_{1'}$ according to an embodiment of the present disclosure.

FIG. 8 is another schematic diagram of the first queue in the enabled state at the moment $t_1$ according to an embodiment of the present disclosure. FIG. 9 is another schematic diagram of the second queue in the enabled state at the moment $t_{1'}$ according to an embodiment of the present disclosure. As shown in FIG. 7 and FIG. 8, the first queue and the second queue are different queues. If the first queue is $Q_x$, and the second queue is $Q_{x-1}$ the enqueuing queue of the first packet is one of N−2 queues other than the first queue $Q_x$ and the second queue $Q_{x-1}$. It should be noted that if a queue in the enabled state at the moment $t_1$ is $Q_x$, the first packet cannot enqueue $Q_x$, because if the first packet enqueues the queue $Q_x$, the first packet may not be sent in time before $Q_x$ is disabled. Therefore, an earliest period in which the first packet can be sent is a period in which $Q_{x+1}$ is enabled. If a queue in the enabled state at $t_1$, is $Q_{x-1}$, the first packet cannot enqueue $Q_{x-1}$ because if the first packet enqueues the queue $Q_{x-1}$ the first packet may not be sent in time before $Q_{x-1}$ is disabled. Therefore, a latest period in which the first packet can be sent is a period in which $Q_{x-2}$ is enabled. In this case, the enqueuing queue of the first packet is one of N−2 queues other than the first queue $Q_x$ and the second queue $Q_{x-1}$.

S1022: The packet marking apparatus determines, from the queues that the first packet can enqueue, the enqueuing queue of the first packet.

The enqueuing queue of the first packet is one queue in a group of gating queues, the group of gating queues include N queues, a duration in which each queue in the N queues is continuously enabled is T, and the N queues are cyclically enabled in a preset order. A total length of packets that can be enqueued in each flow i and each queue in the N queues is less than or equal to a first threshold, or a total length of packets that can be enqueued in each flow i and each queue in the N queues is less than or equal to a sum of a first threshold and a maximum packet length of the flow i, where N is a positive integer greater than 1.

Specifically, the queues that the first packet can enqueue are determined, and whether the first packet can enqueue, and which queue in the queues that the first packet can enqueue need to be further determined. In an implementation, S1022 may be:

First, the packet marking apparatus determines that a total length $B_{add}$ of unqueued packets of a first flow in the queues that the first packet can enqueue is less than a maximum buffer size B of the first flow in the queues that the first packet can enqueue; or the packet marking apparatus determines that a sum of $B_{add}$ and the first packet is less than or equal to B, and the first flow is a flow to which the first packet belongs.

Then, the packet marking apparatus determines, based on $B_{add}$ and the first threshold, the enqueuing queue of the first packet from the queues that the first packet can enqueue.

The unqueued packets of the first flow in the queues that the first packet can enqueue is enqueued packets that are accumulated in the first flow before the enqueuing queue of the first packet is determined. In other words, when the packet marking apparatus determines the enqueuing queue of the first packet, the packet marking apparatus needs to first determine whether a current accumulated total length $B_{add}$ of enqueued packets of the first flow is less than the maximum buffer size B of the first flow in the queues that the first packet can enqueue, or whether a sum of $B_{add}$ and the first packet is less than or equal to B. For the foregoing two cases, determining whether the sum of $B_{add}$ and the first packet is less than or equal to B is applicable when a packet length is unchanged, and determining whether $B_{add}$ is less than or equal to B is applicable when a packet length changes. The method of determining whether $B_{add}$ is less than or equal to B indicates that a total length of packets stored in each queue is long. If the total length of packets stored in each queue is long, the enqueuing queue of the first packet can be determined from the queues that the first packet can enqueue based on $B_{add}$ and the first threshold. As shown in FIG. 5, queues $Q_9$, $Q_0$, $Q_1$, $Q_2$, $Q_3$, $Q_4$, $Q_5$, and $Q_6$ that the first packet can enqueue are used as an example. $B_{add}$ indicates a total length (also referred to as a total quantity of bytes) of packets that are of the first flow and that are enqueued in the queues (that is, buffered) $Q_9$, $Q_0$, $Q_1$, $Q_2$, $Q_3$, $Q_4$, $Q_5$, and $Q_6$. B is a total length (also referred to as a total quantity of bytes) of packets that are of the first flow and that are allowed to be buffered in $Q_9$, $Q_0$, $Q_1$, $Q_2$, $Q_3$, $Q_4$, $Q_5$, and $Q_6$. B may be preconfigured, and a configuration range of B is limited by a quantity of queues that the first packet can enqueue. Optionally, in the queues that the first packet can enqueue shown in FIG. 5, a maximum configuration of B may be $8B_i \times T$.

The maximum buffer size B of the first flow in a currently enqueueable queue may be preconfigured, and the maximum buffer size B of different flows may be different.

Figure 10:
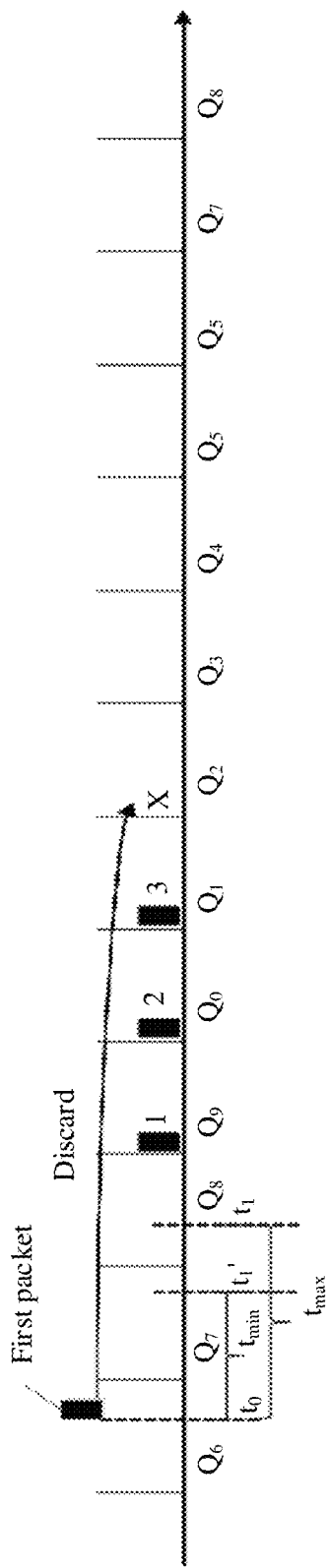
FIG. 10 is a schematic diagram of discarding a first packet according to an embodiment of the present disclosure.

Specifically, B is a maximum buffer size of the first flow in the currently enqueueable queue. When the enqueuing queue of the first packet is determined, it is necessary to first determine whether a total length $B_{add}$ of unqueued packets of the first flow in the currently enqueueable queue, that are not yet outputted, is less than B. If the total length $B_{add}$ of the unqueued packets, of the first flow in the currently enqueueable queue is greater than or equal to B, it indicates that the total length $B_{add}$ of the unqueued packets of the first flow in the currently enqueueable queue reaches or exceeds the maximum buffer size B of the first flow in the currently enqueueable queue. In this case, the first packet cannot be enqueued, and the first packet is discarded. Queues that the first packet can enqueue are allocated only when $B_{add}$ is less than B. FIG. 10 is a schematic diagram of discarding the first packet according to an embodiment of the present disclosure. As shown in FIG. 10, B is equal to $3B_i \times T$, and before the first packet arrives, $B_{add}$ already reaches $3B_i \times T$. Therefore, the first packet is discarded. Alternatively, it is determined whether a sum of $B_{add}$ and the first packet is less than or equal to B, and when the sum of $B_{add}$ and the first packet is less than B, queues that the first packet can enqueue are allocated. When determining that the sum of $B_{add}$ and the first packet is greater than or equal to B, the packet marking apparatus discards the first packet.

Specifically, the packet marking apparatus determines, based on $B_{add}$ and the first threshold, the enqueuing queue of the first packet from the queues that the first packet can enqueue, in the following three implementations:

Specifically, the packet marking apparatus determines, based on $B_{add}$ and the first threshold, the enqueuing queue of the first packet from the queues that the first packet can enqueue, in the following three implementations:

Implementation 1: If $B_{add}$ is greater than or equal to M−1 times the first threshold and less than M times the first threshold, the packet marking apparatus determines that the enqueuing queue of the first packet is an $M^{th}$ queue following the first queue in the queues that the first packet can enqueue, where M is a positive integer greater than or equal to 1.

Specifically, the packet marking apparatus determines an interval in which $B_{add}$ is located directly based on $B_{add}$ and the first threshold. For example, $B_{add}$ is greater than 5 times the first threshold and less than 4 times the first threshold. In this case, the enqueuing queue of the first packet is a $4^{th}$ queue following the first queue in the queues that the first packet can enqueue.

Implementation 2: If a total length of packets that are of the first flow and that are currently enqueued in a $1^{st}$ queue following the first queue is less than the first threshold, the packet marking apparatus determines that the enqueuing queue of the first packet is the $1^{st}$ queue following the first queue.

If a total length of packets that are of the first flow and that are currently enqueued in a $1^{st}$ queue following the first queue is greater than or equal to the first threshold, the packet marking apparatus determines that the enqueuing queue of the first packet is a $K^{th}$ queue following the first queue in the queues that the first packet can enqueue, where K is a positive integer greater than or equal to 2, and a total length of currently enqueued packets in the $K^{th}$ queue is less than the first threshold.

Specifically, in this manner, the enqueuing queue of the first packet starts from the $1^{st}$ queue following the first queue. As shown in FIG. 5, queues $Q_9$, $Q_0$, $Q_1$, $Q_2$, $Q_3$, $Q_4$, $Q_5$, and $Q_6$ that the first packet can enqueue are used as an example. $Q_9$, $Q_0$, $Q_1$, $Q_2$, $Q_3$, $Q_4$, $Q_5$, and $Q_6$ are queues following the first queue. A queue in which a total length of currently enqueued packets is less than the first threshold may be sequentially determined starting from $Q_9$. If the first packet still fails to be enqueued after the first packet attempts to enqueue $Q_6$, the first packet continues to be enqueued cyclically starting from $Q_9$.

That the packet marking apparatus determines that the enqueuing queue of the first packet is a $K^{th}$ queue following the first queue in the queues that the first packet can enqueue may be:

The packet marking apparatus determines, starting from a $2^{nd}$ queue following the first queue, from the queues that the first packet can enqueue, a $1^{st}$ queue in which the total length of currently enqueued packets of the first flow is less than the first threshold, and determines, as the $K^{th}$ queue, the $1^{st}$ queue in which the total length of the currently enqueued packets of the first flow is less than the first threshold.

Implementation 3: If a sum of a total length of packets that are of the first flow and that are currently enqueued in a $1^{st}$ queue following the first queue and a length of the first packet is less than or equal to the first threshold, the packet marking apparatus determines that the enqueuing queue of the first packet is the $1^{st}$ queue following the first queue.

If a sum of a total length of packets that are of the first flow and that are currently enqueued in a $1^{st}$ queue following the first queue and a length of the first packet is greater than a first threshold, the packet marking apparatus determines that the enqueuing queue of the first packet is a $K^{th}$ queue following the first queue in the queues that the first packet can enqueue, where K is a positive integer greater than 1, and a sum of a total length of currently enqueued packets in the $K^{th}$ queue and the length of the first packet is less than the first threshold.

Specifically, in this manner, the enqueuing queue of the first packet starts from the $1^{st}$ queue following the first queue. As shown in FIG. 5, queues $Q_9$, $Q_0$, $Q_1$, $Q_2$, $Q_3$, $Q_4$, $Q_5$, and $Q_6$ that the first packet can enqueue are used as an example. $Q_9$, $Q_0$, $Q_1$, $Q_2$, $Q_3$, $Q_4$, $Q_5$, and $Q_6$ are queues following the first queue. A queue in which a sum of a total length of currently enqueued packets and the length of the first packet is less than the first threshold may be sequentially determined starting from $Q_9$. If the first packet still fails to be enqueued after the first packet attempts to enqueue $Q_6$, the first packet continues to be enqueued cyclically starting from $Q_9$.

That the packet marking apparatus determines that the enqueuing queue of the first packet is a $K^{th}$ queue following the first queue in the queues that the first packet can enqueue may be:

The packet marking apparatus determines, starting from a $2^{nd}$ queue following the first queue, from the queues that the first packet can enqueue, a $1^{st}$ queue in which a sum of a total length of currently enqueued packets of the first flow and the length of the first packet is less than or equal to the first threshold, and determines, as the $K^{th}$ queue, the $1^{st}$ queue in which the sum of the total length of the currently enqueued packets of the first flow and the length of the first packet is less than or equal to the first threshold.

S103: The packet marking apparatus marks a queue identifier of the first packet as a queue identifier of the enqueuing queue of the first packet, and then sends the queue identifier of the enqueuing queue of the first packet to the packet output apparatus.

S104: The packet output apparatus sends, based on the queue identifier of the first packet, the first packet to a corresponding queue for outputting.

Specifically, the packet output apparatus receives the first packet, where the first packet carries a queue identifier, and the queue identifier is the queue identifier of the enqueuing queue of the first packet.

After the packet marking apparatus determines the enqueuing queue of the first packet in S102, for example, determines that the enqueuing queue of the first packet is $Q_2$, the packet marking apparatus sends a queue identifier 2 of the enqueuing queue $Q_2$ of the first packet to the packet output apparatus. The packet output apparatus sends, based on the queue identifier of the first packet, the first packet to a corresponding queue for outputting.

Further, in a possible implementation, after the packet marking apparatus marks the queue identifier of the enqueuing queue of the first packet and sends the first packet to the packet output apparatus in S103, the method may further include:

S105: The packet marking apparatus adds the length of the first packet to $B_{add}$.

Figure 11:
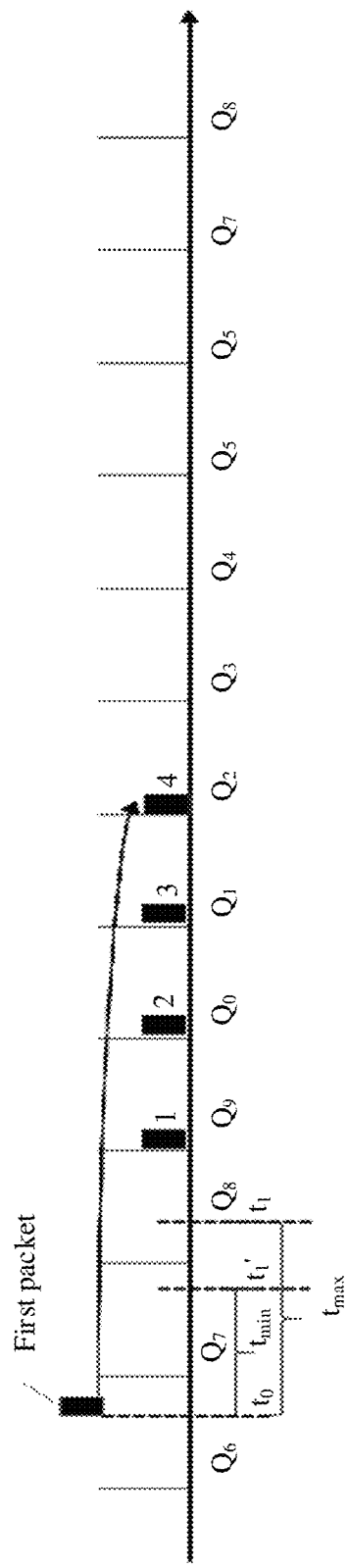
FIG. 11 is a schematic diagram of determining an enqueuing queue of a first packet according to an embodiment of the present disclosure.

FIG. 11 is a schematic diagram of determining the enqueuing queue of the first packet according to an embodiment of the present disclosure. As shown in FIG. 11, the enqueuing queue of the first packet is $Q_2$, and if B is greater than $3B_i \times T$, the length of the first packet is added to $B_{add}$.

S106: The packet marking apparatus subtracts a first threshold from $B_{add}$ when determining that a $1^{st}$ queue that the first packet can enqueue is different from a $1^{st}$ queue that a previous packet of the first packet can enqueue.

Specifically, the $1^{st}$ enqueuing queue of the first packet is a $1^{st}$ queue in the enqueuing queue of the first packet. For example, as shown in FIG. 5, the queues $Q_9$, $Q_0$, $Q_1$, $Q_2$, $Q_3$, $Q_4$, $Q_5$, and $Q_6$ that the first packet can enqueue are used as an example, and the $1^{st}$ queue in the enqueuing queue of the first packet is $Q_9$.

S107: When determining that $B_{add}$ is less than the first threshold, the packet marking apparatus sets $B_{add}$ to 0.

It should be noted that, there is no execution sequence of S105 to S107.

According to the traffic shaping method provided in this embodiment, after receiving the first packet, the packet marking apparatus determines the enqueuing queue of the first packet, marks the queue identifier of the first packet as the queue identifier of the enqueuing queue of the first packet, and then sends the queue identifier of the first packet to the packet output apparatus; and the packet output apparatus sends, based on the queue identifier of the first packet, the first packet to the corresponding queue for outputting. Packets are output from different queues, and enabling time of different queues is known. Therefore, packet output time is fixed, to implement that the packet output time is fixed.

The following describes in detail the technical solution in the method embodiment shown in FIG. 2 by using a specific embodiment.

Figure 12:
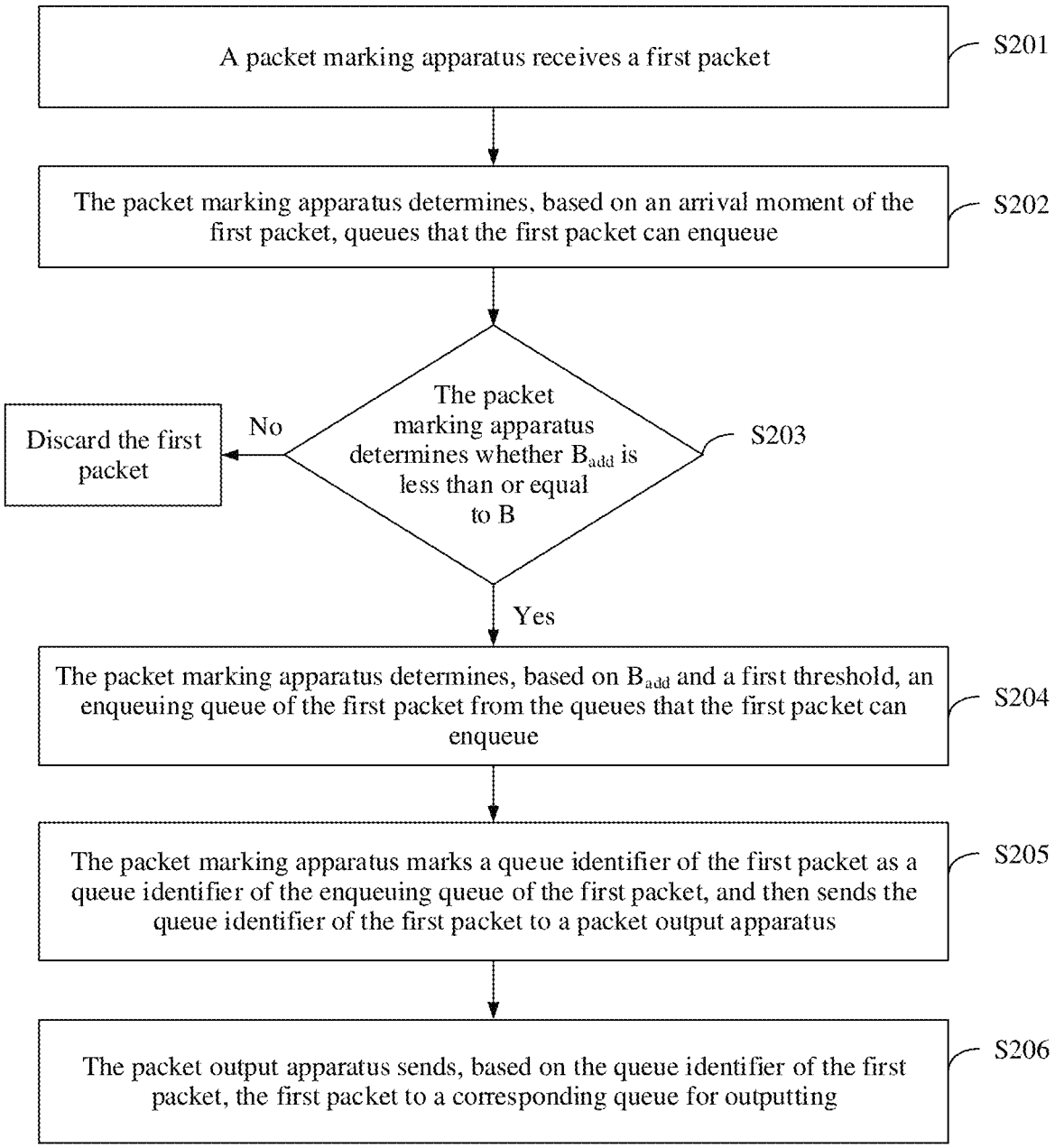
FIG. 12 is a flowchart of an embodiment of a traffic shaping method according to this application.

FIG. 12 is a flowchart of an embodiment of a traffic shaping method according to the present disclosure. As shown in FIG. 9, the method in this embodiment may include the following steps.

S201: A packet marking apparatus receives a first packet.

S202: The packet marking apparatus determines, based on an arrival time of the first packet, queues that the first packet can enqueue.

In an implementation, the packet marking apparatus may determine, based on the arrival time $t_0$ of the first packet, a maximum transmission duration $t_{max}$ required for sending a packet from the packet marking apparatus to a packet output apparatus, and a minimum transmission duration $t_{min}$ required for sending the packet from the packet marking apparatus to the packet output apparatus, the queues that the first packet can enqueue.

Specifically, the queues that the first packet can enqueue may be determined based on a first queue in an enabled state at a moment $t_1=t_0+t_{max}$ and a second queue in the enabled state at a moment $t_1'=t_0+t_{min}$. If the first queue and the second queue are a same queue, the packet marking apparatus determines that the queues that the first packet can enqueue are N−1 queues in a group of gating queues other than the first queue. If the first queue and the second queue are two adjacent queues, the packet marking apparatus determines that the queues that the first packet can enqueue are N−2 queues in the group of gating queues other than the first queue and the second queue. If there are J queues between the first queue and the second queue, the packet marking apparatus determines that the queues that the first packet can enqueue are N−J−2 queues in the group of gating queues other than the first queue, the second queue, and the J queues between the first queue and the second queue.

S203: The packet marking apparatus determines whether a total length $B_{add}$ of unqueued packets of the first flow in the queues that the first packet can enqueue is less than a maximum buffer size B of the first flow in the queues that the first packet can enqueue, where the first flow is a flow to which the first packet belongs.

If $B_{add}$ is less than B, S204 is performed, or if $B_{add}$ is greater than or equal to B, the first packet is discarded.

Specifically, B is the maximum buffer size of the first flow in a currently enqueueable queue. When the enqueuing queue of the first packet is determined, it is necessary to first determine whether a total length $B_{add}$ of unqueued packets of the first flow in the currently enqueueable queue is less than B. If the total length $B_{add}$ of the unqueued packets of the first flow in the currently enqueueable queue is greater than or equal to B, it indicates that the total length $B_{add}$ of the unqueued packets of the first flow in the currently enqueueable queue reaches or exceeds the maximum buffer size B of the first flow in the currently enqueueable queue. In this case, the first packet cannot enqueue. When the total length of the unqueued packets of the first flow in the currently enqueueable queue is less than or equal to B, queues that the first packet can enqueue are allocated.

In another possible implementation, S203 may be: The packet marking apparatus determines whether a sum of $B_{add}$ and the first packet is less than or equal to B. If $B_{add}$ is less than B, S204 is performed, or if $B_{add}$ is greater than or equal to B, the first packet is discarded.

S204: The packet marking apparatus determines, based on $B_{add}$ and a first threshold, the enqueuing queue of the first packet from the queues that the first packet can enqueue.

Specifically, the packet marking apparatus determines, based on $B_{add}$ and the first threshold, the enqueuing queue of the first packet from the queues that the first packet can enqueue in the following three implementations. For details, refer to related descriptions in the embodiment shown in FIG. 2.

S205: The packet marking apparatus marks a queue identifier of the first packet as a queue identifier of the enqueuing queue of the first packet, and then sends the queue identifier of the enqueuing queue of the first packet to the packet output apparatus.

S206: The packet output apparatus sends, based on the queue identifier of the first packet, the first packet to a corresponding queue for outputting.

Figure 13:
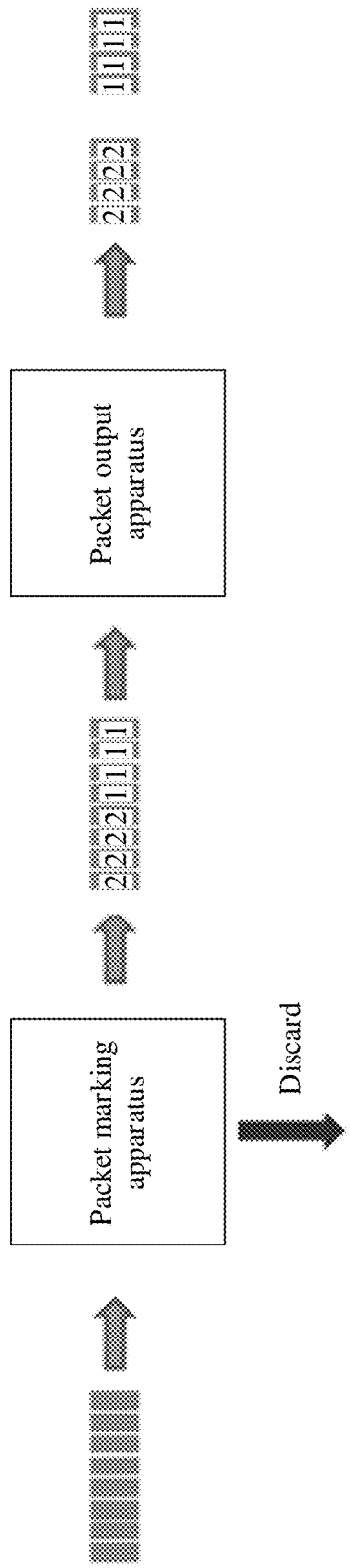
FIG. 13 is a schematic diagram of a process in which a packet is sent to a packet output apparatus after the packet is processed by a packet marking apparatus.

FIG. 13 is a schematic diagram of a process in which a packet is sent to a packet output apparatus after the packet is processed by a packet marking apparatus. As shown in FIG. 13, the packet marking apparatus processes packets flow by flow. For example, a plurality of packets shown in FIG. 13 are received, and receiving moments of the plurality of packets may be the same or different. For a $1^{st}$ packet, the packet marking apparatus discards the $1^{st}$ packet when determining that a total length $B_{add}$ of unqueued packets of a first flow in queues that the first packet can enqueue is less than or equal to a maximum buffer size B of the first flow in the queues that the first packet can enqueue, where the first flow is a flow to which the first packet belongs. When determining that $B_{add}$ is less than B, the packet marking apparatus determines, by performing S204, a queue that a $1^{st}$ packet can enqueue, and then marks a corresponding queue identifier of the queue and sends the queue identifier to the packet output apparatus. Then, a $2^{nd}$ packet is also processed in the same way, and the packet output apparatus marks a corresponding identifier and sends the queue identifier to the packet output apparatus. For example, as shown in FIG. 13, a first part of the packets enqueue a queue 1, and a second part of the packets enqueue a queue 2. The packet output apparatus sends each packet to a corresponding queue based on an identifier of each packet, and outputs the packet when a queue is enabled.

Figure 14:
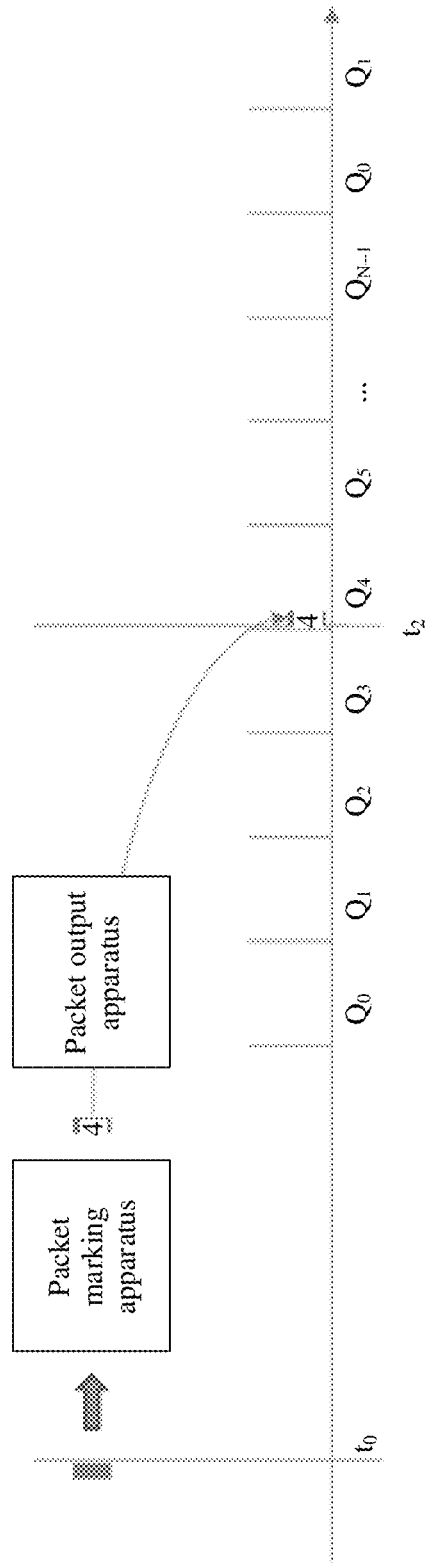
FIG. 14 is a schematic diagram of outputting a packet within determined time.

According to the traffic shaping method provided in the present disclosure, a packet can be output within determined time. For example, FIG. 14 is a schematic diagram of outputting a packet within the determined time. A first packet arrives at a current network device at a moment $t_0$, that is, the first packet arrives at a packet marking apparatus at the moment $t_0$. A moment at which the first packet may arrive at a packet output apparatus is a value between $t_1$ and $t_1'$, where $t_1=t_0+t_{max}$, and $t_1'=t_0+t_{min}$. A queue in an enabled state at the moment $t_1$ is a first queue. It is assumed that start time of a $1^{st}$ queue following the first queue is $t_2$. The first packet may be controlled to be output between $t_2$ and $t_2+m\times T$ by using the traffic shaping method provided in this embodiment, where m is greater than or equal to 1. For example, if the first packet is controlled to be output between $t_2$ and $t_2+T$, and a queue enabled at the moment $t_2+T$ is queue 4, after marking the first packet with a queue identifier 4, the packet marking apparatus sends the first packet to the packet output apparatus, the packet output apparatus sends the first packet to the queue 4, and the queue 4 is enabled at the moment $t_2+T$ and disabled at the moment $t_2+2T$. In this way, a packet is output within determined time.

After S205, the method in this embodiment may further include the following steps.

S207: The packet marking apparatus adds a length of the first packet to $B_{add}$.

S208: The packet marking apparatus subtracts a first threshold from $B_{add}$ when determining that a $1^{st}$ queue that the first packet can enqueue is different from a $1^{st}$ queue that a previous packet of the first packet can enqueue.

Figure 15:
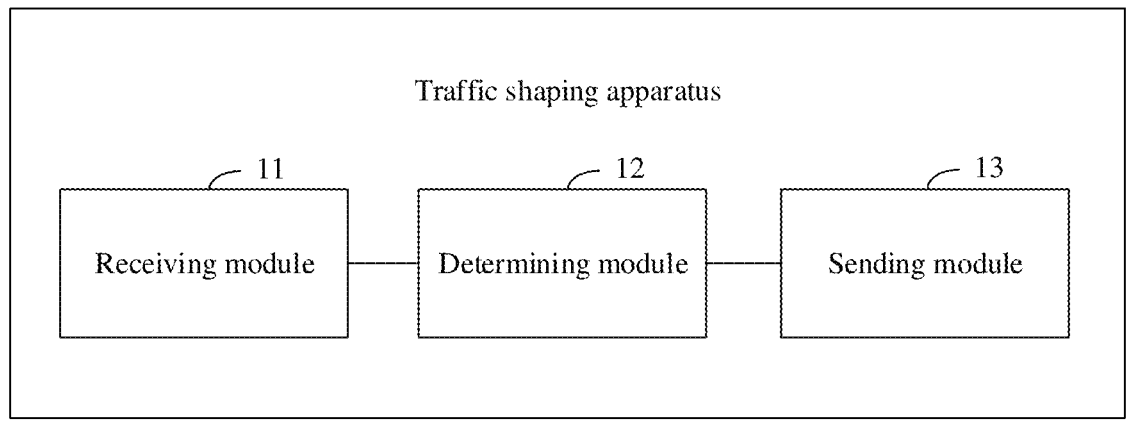
FIG. 15 is a schematic diagram of a structure of an embodiment of a traffic shaping apparatus according to the present disclosure.

FIG. 15 is a schematic diagram of a structure of an embodiment of a traffic shaping apparatus according to the present disclosure. As shown in FIG. 15, the apparatus in this embodiment may include a receiving module 11, a determining module 12, and a sending module 13.

The receiving module 11 is configured to receive a first packet.

The determining module 12 is configured to determine an enqueuing queue of the first packet.

The sending module 13 is configured to: mark a queue identifier of the first packet as a queue identifier of the enqueuing queue of the first packet, and then send the queue identifier of the first packet to a packet output apparatus, where the packet output apparatus is configured to send, based on the queue identifier of the first packet, the first packet to a corresponding queue for outputting.

The apparatus in this embodiment may be configured to perform the technical solution in the method embodiment shown in FIG. 2. Implementation principles and technical effects of the apparatus are similar.

Figure 16:
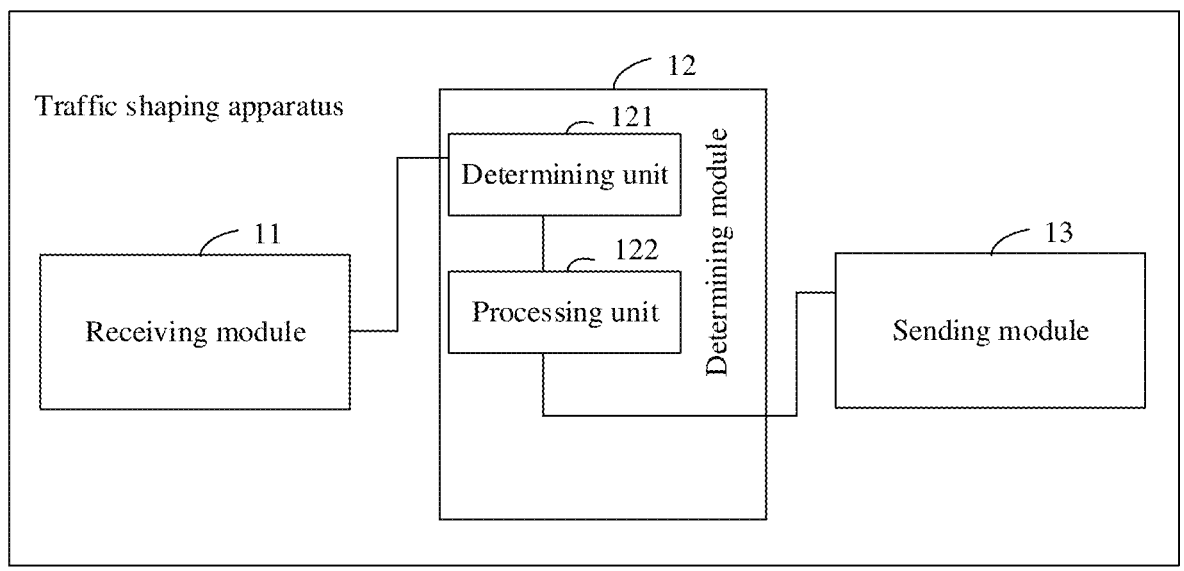
FIG. 16 is a schematic diagram of a structure of an embodiment of a traffic shaping apparatus according to the present disclosure.

FIG. 16 is a schematic diagram of a structure of an embodiment of a traffic shaping apparatus according to the present disclosure. As shown in FIG. 16, the apparatus in this embodiment is based on the apparatus shown in FIG. 15. Further, the determining module 12 includes a determining unit 121 and a processing unit 122.

The determining unit 121 is configured to determine, based on an arrival time of the first packet, queues that the first packet can enqueue.

The processing unit 122 is configured to determine the enqueuing queue of the first packet from the queues that the first packet can enqueue, where the enqueuing queue is one queue in a group of gating queues, the group of gating queues include N queues, a duration in which each queue in the N queues is continuously enabled is T, and the N queues are cyclically enabled in a preset order. A total length of packets that can be enqueued in each flow i and each queue in the N queues is less than or equal to a first threshold, or a total length of packets that can be enqueued in each flow i and each queue in the N queues is less than or equal to a sum of a first threshold and a maximum packet length of the flow i, where N is a positive integer greater than 1, and i is a positive integer.

Optionally, the determining unit 121 is configured to:
determine, based on the arrival time of the first packet, a maximum transmission duration $t_{max}$ required for sending the packet from the packet marking apparatus to the packet output apparatus, and a minimum transmission duration $t_{min}$ required for sending the packet from the packet marking apparatus to the packet output apparatus, the queues that the first packet can enqueue.

Optionally, the determining unit 121 is configured to:
calculate, based on the arrival time $t_0$ of the first packet and $t_{max}$, a latest moment $t_1 = t_0 + t_{max}$ at which the first packet arrives at the packet output apparatus, and calculate, based on the arrival time $t_0$ of the first packet and $t_{min}$, an earliest moment $t_{1'} = t_0 + t_{min}$ at which the first packet arrives at the packet output apparatus; and
determine, based on a first queue in an enabled state at the moment $t_1$ and a second queue in the enabled state at the moment $t_{1'}$, the queues that the first packet can enqueue.

Optionally, the determining unit 121 is configured to: if the first queue and the second queue are a same queue, determine that the queues that the first packet can enqueue are N−1 queues in the group of gating queues other than the first queue;

if the first queue and the second queue are two adjacent queues, determine that the queues that the first packet can enqueue are N−2 queues in the group of gating queues other than the first queue and the second queue; or if there are J queues between the first queue and the second queue, determine that the queues that the first packet can enqueue are N−J−2 queues in the group of gating queues other than the first queue, the second queue, and the J queues between the first queue and the second queue.

Optionally, the processing unit 122 is configured to: determine that a total length $B_{add}$ of unqueued packets of the first flow in the queues that the first packet can enqueue is less than a maximum buffer size B of the first flow in the queues that the first packet can enqueue, where the first flow is a flow to which the first packet belongs; or determine that a sum of $B_{add}$ and the first packet is less than or equal to B, and determine, based on $B_{add}$ and the first threshold, the enqueuing queue of the first packet from the queues that the first packet can enqueue.

Optionally, the processing unit 122 is configured to: if $B_{add}$ is greater than or equal to M−1 times the first threshold and less than M times the first threshold, determine that the enqueuing queue of the first packet is an $M^{th}$ queue following the first queue in the queues that the first packet can enqueue, where M is a positive integer greater than or equal to 1.

Optionally, the processing unit 122 is configured to:
if a total length of packets that are of the first flow and that are currently enqueued in a $1^{st}$ queue following the first queue is less than the first threshold, determine that the enqueuing queue of the first packet is the $1^{st}$ queue following the first queue; or if a total length of packets that are of the first flow and that are currently enqueued in a $1^{st}$ queue following the first queue is greater than or equal to the first threshold, determine that the enqueuing queue of the first packet is a $K^{th}$ queue following the first queue in the queues that the first packet can enqueue, where K is a positive integer greater than or equal to 2; and a total length of currently enqueued packets in the $K^{th}$ queue is less than the first threshold.

Optionally, the processing unit 122 is specifically configured to:
determine, starting from a $2^{nd}$ queue following the first queue, from the queues that the first packet can enqueue, a $1^{st}$ queue in which the total length of currently enqueued packets of the first flow is less than the first threshold; and determine, as the $K^{th}$ queue, the $1^{st}$ queue in which the total length of the currently enqueued packets of the first flow is less than the first threshold.

Optionally, the processing unit 122 is configured to:
if a sum of a total length of packets that are of the first flow and that are currently enqueued in a $1^{st}$ queue following the first queue and a length of the first packet is less than or equal to the first threshold, determine that the enqueuing queue of the first packet is the $1^{st}$ queue following the first queue; or if a sum of a total length of packets that are of the first flow and that are currently enqueued in a $1^{st}$ queue following the first queue and a length of the first packet is greater than the first threshold, determine that the enqueuing queue of the first packet is an $M^{th}$ queue following the first queue in the queues that the first packet can enqueue, where M is a positive integer greater than 1, and a sum of a total length of currently enqueued packets in the $M^t$h queue and the length of the first packet is less than the first threshold.

Optionally, the processing unit 122 is specifically configured to:

determine, starting from a $2^{nd}$ queue following the first queue, from the queues that the first packet can enqueue, a $1^{st}$ queue in which a sum of a total length of currently enqueued packets of the first flow and the length of the first packet is less than or equal to the first threshold; and determine, as an $M^{th}$ queue, a $1^{st}$ queue in which a sum of a total length of currently enqueued packets of the first flow and the length of the first packet is less than or equal to the first threshold.

Further, the processing unit 122 is further configured to: determine that $B_{add}$ is greater than or equal to B; or determine that the sum of $B_{add}$ and the first packet is greater than B, and discard the first packet.

Further, the processing unit 122 is further configured to: after the queue identifier of the first packet is marked as the queue identifier of the enqueuing queue of the first packet, and the queue identifier of the enqueuing queue of the first packet is sent to the packet output apparatus, add the length of the first packet to $B_a$da; when determining that a $1^{st}$ queue that the first packet can enqueue is different from a $1^{st}$ queue that a previous packet of the first packet can enqueue, subtract the first threshold from $B_a$da; and when determining that $B_{add}$ is less than the first threshold, set $B_{add}$ to 0.

Optionally, the first threshold is $B_i \times T$, and $B_i$ is a bandwidth of the first flow.

The apparatus in this embodiment may be configured to perform the technical solutions in the foregoing method embodiment. Implementation principles and technical effects of the apparatus are similar.

Figure 17:
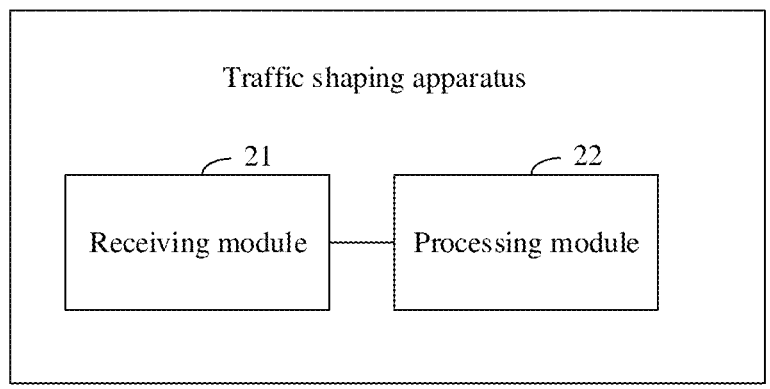
FIG. 17 is a schematic diagram of a structure of an embodiment of a traffic shaping apparatus according to the present disclosure.

FIG. 17 is a schematic diagram of a structure of an embodiment of a traffic shaping apparatus according to the present disclosure. As shown in FIG. 17, the apparatus in this embodiment may include a receiving module 21 and a processing module 22.

The receiving module 21 is configured to receive a first packet, where the first packet carries a queue identifier, and the queue identifier is a queue identifier of an enqueuing queue of the first packet.

The processing module 22 is configured to send, based on the queue identifier of the first packet, the first packet to a corresponding queue for outputting.

Optionally, the enqueuing queue of the first packet is one queue in a group of gating queues, the group of gating queues include N queues, a duration in which each queue in the N queues is continuously enabled is T, and the N queues are cyclically enabled in a preset order. A total length of packets that can be enqueued in each flow i and each queue in the N queues is less than or equal to a first threshold, or a total length of packets that can be enqueued in each flow i and each queue in the N queues is less than or equal to a sum of a first threshold and a maximum packet length of the flow i, where N is a positive integer greater than 1, and i is a positive integer.

Optionally, the first threshold is $B_i \times T$, $B_i$ is a bandwidth of a first flow, and the first flow is a flow to which the first packet belongs.

Figure 18:
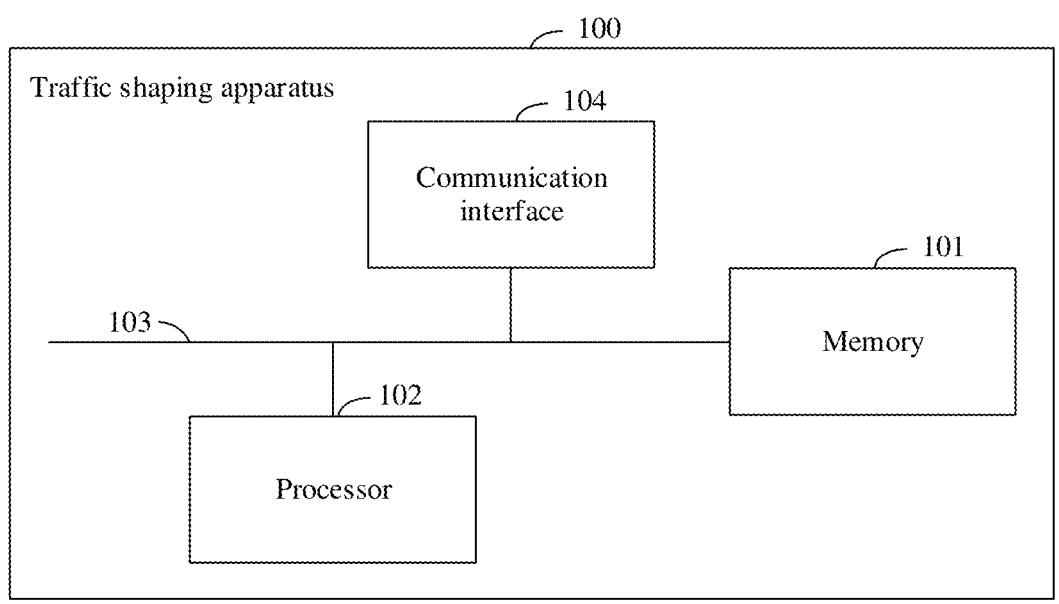
FIG. 18 is a schematic diagram of a structure of a traffic shaping apparatus according to the present disclosure.

FIG. 18 is a schematic diagram of a structure of a traffic shaping apparatus according to the present disclosure. A flow i traffic shaping apparatus 100 includes:

a memory 101 and a processor 102.

The memory 101 is configured to store a computer program.

The processor 102 is configured to execute the computer program stored in the memory, to implement the key agreement method in the foregoing embodiment. For details, refer to related descriptions in the foregoing method embodiment.

Optionally, the memory 101 may be independent, or may be integrated with the processor 102.

When the memory 101 is a component independent of the processor 102, the traffic shaping apparatus 100 may further include:

a bus 103, configured to connect the memory 101 and the processor 102.

Optionally, this embodiment further includes a communication interface 104. The communication interface 104 may be connected to the processor 102 through the bus 103. The processor 102 may control the communication interface 104 to implement the foregoing obtaining function of the traffic shaping apparatus 100.

The apparatus may be configured to perform steps and/or procedures in the foregoing method embodiment.

The present disclosure further provides a readable storage medium. The readable storage medium stores executable instructions. When at least one processor of an electronic device executes the executable instructions, the electronic device performs the traffic shaping method in the foregoing method embodiment.

The present disclosure further provides a program product. The program product includes execution instructions, and the execution instructions are stored in a readable storage medium. At least one processor of an electronic device may read the executable instructions from the readable storage medium, and the at least one processor executes the executable instructions, so that the electronic device implements the traffic shaping method in the foregoing method embodiment.

The present disclosure further provides a chip. The chip is connected to a memory, or a memory is integrated on the chip. When a software program stored in the memory is executed, the traffic shaping method in the foregoing method embodiment is implemented.

A person of ordinary skill in the art may understand that all or some of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk, or a magnetic tape), an optical medium (for example, a DVD), a semi-conductor medium (for example, a Solid State Disk (SSD)), or the like.

What is claimed is:

1. A traffic shaping method, comprising:
   receiving, by a packet marking apparatus, a packet in a first flow among a plurality of flows;
   determining, by the packet marking apparatus, an enqueuing queue of the packet;
   marking, by the packet marking apparatus, a queue identifier of the packet as a queue identifier of the enqueuing queue of the packet; and
   after marking the queue identifier of the packet, sending, by the packet marking apparatus, the queue identifier of the packet to a packet output apparatus, wherein the packet output apparatus is configured to use the received queue identifier of the packet to send the packet to a corresponding queue for outputting,
   wherein the determining, by the packet marking apparatus, an enqueuing queue of the packet comprises:
   determining, by the packet marking apparatus based on an arrival time of the packet, queues to which the packet can enqueue; and
   determining, by the packet marking apparatus, the enqueuing queue of the packet from the determined queues to which the packet can enqueue, wherein the enqueuing queue is one queue in a group of gating queues, the group of gating queues comprise N queues, T is a duration in which each queue in the N queues is continuously enabled, and the N queues are cyclically enabled in a preset order,
   wherein the determining, by the packet marking apparatus based on an arrival time of the packet, queues to which the packet can enqueue comprises:
   calculating, by the packet marking apparatus based on the arrival time $t_0$ of the packet and $t_{max}$, a latest moment $t_1=t_0+t_{max}$ at which the packet arrives at the packet output apparatus, and
   calculating, by the packet marking apparatus based on the arrival time $t_0$ of the packet and $t_{min}$, an earliest moment $t_{1'}=t_0+t_{min}$ at which the packet arrives at the packet output apparatus; and
   determining, by the packet marking apparatus based on a first queue that is enabled at the latest moment $t_1$ and a second queue that is enabled at the earliest moment $t_{1'}$, the queues to which the packet can enqueue,
   wherein the determined queues to which the packet can enqueue are queues in the N queues other than the first queue and the second queue.

2. The method according to claim 1, wherein the determining, by the packet marking apparatus based on a first queue that is enabled at the latest moment $t_1$ and a second queue that is enabled at the earliest moment $t_{1'}$, the queues to which the packet can enqueue comprises:
   when the first queue and the second queue are a same queue in the N queues, determining, by the packet marking apparatus, that the queues to which the packet can enqueue are N−1 queues in the N queues other than the first queue;
   when the first queue and the second queue are two adjacent queues in the N queues, determining, by the packet marking apparatus, that the queues to which the packet can enqueue are N−2 queues in the N queues other than the first queue and the second queue; or
   when there are J queues between the first queue and the second queue in the N queues, determining, by the packet marking apparatus, that the queues to which the packet can enqueue are N−J−2 queues in the N queues other than the first queue, the second queue, and the J queues between the first queue and the second queue.

3. The method according to claim 1, wherein a total length of multiple packets, in each flow, that can be enqueued in each of the N queues is less than or equal to a threshold, or a total length of multiple packets, in each flow, that can be enqueued in each of the N queues is less than or equal to a sum of a threshold and a maximum packet length of the respective flow, wherein N is an integer greater than 1, and
   wherein the determining, by the packet marking apparatus, the enqueuing queue of the packet from the queues to which the packet can enqueue comprises:
   determining, by the packet marking apparatus, that a total length $B_{add}$ of unqueued packets of the first flow in the queues to which the packet can enqueue is less than a maximum buffer size of the first flow in the queues to which the packet can enqueue, wherein the packet belongs to the first flow; or determining, by the packet marking apparatus, that a sum of $B_{add}$ and the packet is less than or equal to the maximum buffer size; and
   determining, by the packet marking apparatus based on $B_{add}$ and the threshold, the enqueuing queue of the packet from the queues to which the packet can enqueue.

4. The method according to claim 3, wherein the determining, by the packet marking apparatus based on $B_{add}$ and the threshold, the enqueuing queue of the packet from the queues to which the packet can enqueue comprises:
   when $B_{add}$ is greater than or equal to M−1 times the threshold and less than M times the threshold, determining, by the packet marking apparatus, that the enqueuing queue of the packet is an $M^{th}$ queue following the first queue in the queues to which the packet can enqueue, wherein M is a positive integer greater than or equal to 1.

5. The method according to claim 3, wherein the determining, by the packet marking apparatus based on $B_{add}$ and the threshold, the enqueuing queue of the packet from the queues to which the packet can enqueue comprises:
   when a total length of multiple packets that are of the first flow and that are currently enqueued in a $1^{st}$ queue following the first queue is less than the threshold, determining, by the packet marking apparatus, that the enqueuing queue of the packet is the $1^{st}$ queue following the first queue; or
   when a total length of multiple packets that are of the first flow and that are currently enqueued in a $1^{st}$ queue following the first queue is greater than or equal to the threshold, determining, by the packet marking apparatus, that the enqueuing queue of the packet is a $K^{th}$ queue following the first queue in the queues to which the packet can enqueue, wherein K is a positive integer greater than or equal to 2, and a total length of currently enqueued packets in the $K^{th}$ queue is less than the threshold.

6. The method according to claim 5, wherein the determining, by the packet marking apparatus, that the enqueuing queue of the packet is a $K^{th}$ queue following the first queue in the queues to which the packet can enqueue comprises:
   starting from a $2^{nd}$ queue following the first queue, determining, by the packet marking apparatus from the queues to which the packet can enqueue, a $1^{st}$ queue in which the total length of currently enqueued packets of the first flow is less than the threshold; and determining, as the $K^{th}$ queue, the $1^{st}$ queue in which the total length of the currently enqueued packets of the first flow is less than the threshold.

7. The method according to claim 3, wherein the determining, by the packet marking apparatus based on $B_{add}$ and the threshold, the enqueuing queue of the packet from the queues to which the packet can enqueue comprises:
  when a sum of a total length of multiple packets that are of the first flow and that are currently enqueued in a $1^{st}$ queue following the first queue and a length of the packet is less than or equal to the threshold, determining, by the packet marking apparatus, that the enqueuing queue of the packet is the $1^{st}$ queue following the first queue; or
  when a sum of a total length of multiple packets that are of the first flow and that are currently enqueued in a $1^{st}$ queue following the first queue and a length of the packet is greater than the threshold, determining, by the packet marking apparatus, that the enqueuing queue of the packet is a $K^{th}$ queue following the first queue in the queues to which the packet can enqueue, wherein K is a positive integer greater than or equal to 2, and a sum of a total length of currently enqueued packets in the $K^{th}$ queue and the length of the packet is less than the threshold.

8. A traffic shaping method, comprising:
  receiving, by a packet output apparatus, a packet in a first row among a plurality of flows, wherein the packet carries a queue identifier of an enqueuing queue of the packet; and
  sending, by the packet output apparatus based on the queue identifier of the packet, the packet to a corresponding queue for outputting,
  wherein the enqueuing queue of the packet is one queue in a group of gating queues, the group of gating queues comprise N queues, T is a duration in which each queue in the N queues is continuously enabled, and the N queues are cyclically enabled in a preset order; and a total length of multiple packets, in each flow, that can be enqueued in each queue in the N queues is less than or equal to a threshold, or a total length of multiple packets, in each flow, that can be enqueued in each queue in the N queues is less than or equal to a sum of a threshold and a maximum packet length of the respective flow, wherein N is an integer greater than 1,
  wherein the threshold is determined by multiplying a bandwidth of the first flow by the duration T, and the packet belongs to the first flow.

9. A traffic shaping apparatus, comprising at least one processor and at least one memory storing instructions that, when executed by the at least one processor, cause the traffic shaping apparatus to perform operations comprising:
  receiving a packet in a first flow among a plurality of flows;
  determining an enqueuing queue of the packet;
  marking a queue identifier of the packet as a queue identifier of the enqueuing queue of the packet; and
  after marking the queue identifier of the packet, sending the queue identifier of the packet to a packet output apparatus, wherein the packet output apparatus is configured to use the received queue identifier of the packet to send the packet to a corresponding queue for outputting,
  wherein the determination of the enqueuing queue comprises:
  determining, based on an arrival time of the packet, queues to which the packet can enqueue; and
  determining the enqueuing queue of the packet from the determined queues to which the packet can enqueue, wherein the enqueuing queue is one queue in a group of gating queues, the group of gating queues comprise N queues, T is a duration in which each queue in the N queues is continuously enabled, and the N queues are cyclically enabled in a preset order,
  wherein the determining, by the packet marking apparatus based on an arrival time of the packet, queues to which the packet can enqueue comprises:
  calculating, by the packet marking apparatus based on the arrival time $t_0$ of the packet and $t_{max}$, a latest moment $t_1 = t_0 + t_{max}$ at which the packet arrives at the packet output apparatus, and
  calculating, by the packet marking apparatus based on the arrival time $t_0$ of the packet and $t_{min}$, an earliest moment $t_{1'} = t_0 + t_{min}$ at which the packet arrives at the packet output apparatus; and
  determining, by the packet marking apparatus based on a first queue that is enabled at the latest moment $t_1$ and a second queue that is enabled at the earliest moment $t_{1'}$, the queues to which the packet can enqueue, wherein the determined queues to which the packet can enqueue are queues in the N queues other than the first queue and the second queue.

10. The apparatus according to claim 9, wherein the determination of the enqueuing queue comprises:
  when the first queue and the second queue are a same queue in the N queues, determining that the queues to which the packet can enqueue are N−1 queues in the N queues other than the first queue;
  when the first queue and the second queue are two adjacent queues in the N queues, determining that the queues to which the packet can enqueue are N−2 queues in the N queues other than the first queue and the second queue; or
  when there are J queues between the first queue and the second queue in the N queues, determining that the queues to which the packet can enqueue are N−J−2 queues in the N queues other than the first queue, the second queue, and the J queues between the first queue and the second queue.

11. The apparatus according to claim 9, wherein a total length of multiple packets, in each flow, that can be enqueued in each of the N queues is less than or equal to a threshold, or a total length of multiple packets, in each flow, that can be enqueued in each of the N queues is less than or equal to a sum of a threshold and a maximum packet length of the respective flow, wherein N is an integer greater than 1, and
  wherein the determining the enqueuing queue of the packet from the queues that the packet can enqueue comprises:
  determining that a total length $B_{add}$ of unqueued packets of the first flow in the queues to which the packet can enqueue is less than a maximum buffer size of the first flow in the queues to which the packet can enqueue, wherein the packet belongs to the first flow; or determining, that a sum of $B_{add}$ and the packet is less than or equal to the maximum buffer size; and
  determining, based on $B_{add}$ and the threshold, the enqueuing queue of the packet from the queues to which the packet can enqueue.

12. The apparatus according to claim 11, wherein the determining the enqueuing queue of the packet from the queues that the packet can enqueue comprises:
  when $B_{add}$ is greater than or equal to M−1 times the threshold and less than M times the threshold, determining that the enqueuing queue of the packet is an $M^{th}$ queue following the first queue in the queues to which the packet can enqueue, wherein M is a positive integer greater than or equal to 1.

\* \* \* \* \*

UNITED STATES PATENT AND TRADEMARK OFFICE
CERTIFICATE OF CORRECTION

PATENT NO. : 12,425,345 B2  
APPLICATION NO. : 18/192063  
DATED : September 23, 2025  
INVENTOR(S) : Rui Meng et al.

Page 1 of 1

It is certified that error appears in the above-identified patent and that said Letters Patent is hereby corrected as shown below:

In the Claims

Column 27, Claim 8, Line 25, change "row" to --flow--.

Signed and Sealed this  
Twenty-first Day of October, 2025

John A. Squires  
*Director of the United States Patent and Trademark Office*